(12) United States Patent  
Ramalingam et al.

(10) Patent No.: US 12,288,405 B2  
(45) Date of Patent: Apr. 29, 2025

(54) METHODS, SYSTEMS, ARTICLES OF MANUFACTURE AND APPARATUS TO EXTRACT REGION OF INTEREST TEXT FROM RECEIPTS

(71) Applicant: Nielsen Consumer LLC, Chicago, IL (US)

(72) Inventors: Venkadachalam Ramalingam, Chennai (IN); Sricharan Amarnath, Chennai (IN); Raju Kumar Allam, Chennai (IN); Sreenidhi N. Upadhya, Chennai (IN); Kannan Shanmuganathan, Chennai (IN); Hussain Masthan, Chennai (IN)

(73) Assignee: NIELSEN CONSUMER LLC, Chicago, IL (US)

( * ) Notice: Subject to any disclaimer, the term of this patent is extended or adjusted under 35 U.S.C. 154(b) by 346 days.

(21) Appl. No.: 17/822,664

(22) Filed: Aug. 26, 2022

(65) Prior Publication Data

US 2023/0196806 A1    Jun. 22, 2023

Related U.S. Application Data

(60) Provisional application No. 63/292,973, filed on Dec. 22, 2021.

(51) Int. Cl.
*G06V 30/146* (2022.01)
*G06V 30/148* (2022.01)
*G06V 30/19* (2022.01)

(52) U.S. Cl.
CPC .......... *G06V 30/147* (2022.01); *G06V 30/153* (2022.01); *G06V 30/19107* (2022.01)

(58) Field of Classification Search
CPC ........... G06V 30/147; G06V 30/19107; G06V 30/153
See application file for complete search history.

(56) References Cited

U.S. PATENT DOCUMENTS

| 3,323,135 A | 6/1967 | Miller |
| 5,410,611 A | 4/1995 | Huttenlocher et al. |

(Continued)

FOREIGN PATENT DOCUMENTS

| CA | 2957433 A1 | 9/2017 |
| CA | 2957433 C | 6/2020 |

(Continued)

OTHER PUBLICATIONS

United States Patent and Trademark Office, "Notice of Allowance and Fee(s) Due," issued in connection with U.S. Appl. No. 18/191,642, dated Jun. 17, 2024, 9 pages.

(Continued)

*Primary Examiner* — David Perlman
(74) *Attorney, Agent, or Firm* — Hanley, Flight & Zimmerman, LLC

(57) ABSTRACT

Methods, apparatus, systems and articles of manufacture are disclosed for text extraction from a receipt image. An example non-transitory computer readable medium comprises instructions that, when executed, cause a machine to at least improve region of interest detection efficiency by converting pixels of an input receipt image from a first format to a second format, generate a binary representation of the input receipt image based on the converted pixels, the binary representation of the input receipt image corresponding to saturation values for respective ones of the converted pixels, calculate mirror data from the binary representation of the input receipt image, and cluster the binary representation of the input receipt image to identify a first set of candidate regions of interest, the candidate regions of interest characterized by portions of the binary representation of the input receipt image having saturation values that satisfy a threshold value.

20 Claims, 14 Drawing Sheets

(56) References Cited

U.S. PATENT DOCUMENTS

| | | |
|---|---|---|
| 5,606,690 A | 2/1997 | Hunter et al. |
| 7,454,063 B1 | 11/2008 | Kneisl et al. |
| 7,792,709 B1 | 9/2010 | Trindal et al. |
| 8,285,047 B2 | 10/2012 | Nagarajan et al. |
| 8,494,281 B2 | 7/2013 | Nagarajan |
| 8,787,695 B2 | 7/2014 | Wu et al. |
| 8,792,141 B2 | 7/2014 | Moore et al. |
| 8,983,170 B2 | 3/2015 | Nepomniachtchi et al. |
| 9,014,432 B2 | 4/2015 | Fan et al. |
| 9,158,744 B2 | 10/2015 | Rao et al. |
| 9,239,952 B2 | 1/2016 | Hsu et al. |
| 9,262,686 B1 | 2/2016 | Singer |
| 9,290,022 B2 | 3/2016 | Makabe |
| 9,298,685 B2 | 3/2016 | Barrus et al. |
| 9,298,979 B2 | 3/2016 | Nepomniachtchi et al. |
| 9,323,135 B1 | 4/2016 | Veloso |
| 9,324,073 B2 | 4/2016 | Nepomniachtchi et al. |
| 9,384,389 B1 | 7/2016 | Sankaranarayanan et al. |
| 9,384,839 B2 | 7/2016 | Avila et al. |
| 9,396,540 B1 | 7/2016 | Sampson |
| 9,684,842 B2 | 6/2017 | Deng |
| 9,710,702 B2 | 7/2017 | Nepomniachtchi et al. |
| 9,747,504 B2 | 8/2017 | Ma et al. |
| 9,760,786 B2 | 9/2017 | Sahagun et al. |
| 9,824,270 B1 | 11/2017 | Mao |
| 9,875,385 B1 | 1/2018 | Humphreys |
| 10,026,061 B2 | 7/2018 | Cheek |
| 10,032,072 B1 | 7/2018 | Tran et al. |
| 10,157,425 B2 | 12/2018 | Chelst et al. |
| 10,235,585 B2 | 3/2019 | Deng |
| 10,242,285 B2 | 3/2019 | Thrasher et al. |
| 10,395,772 B1 | 8/2019 | Lucas et al. |
| 10,679,283 B1 | 6/2020 | Pesce |
| 11,257,049 B1 | 2/2022 | Durazo Almeida |
| 11,321,956 B1 | 5/2022 | Geng |
| 11,410,446 B2 | 8/2022 | Shanmuganathan et al. |
| 11,414,053 B2 | 8/2022 | Tanaami et al. |
| 11,468,491 B2 | 10/2022 | Dalal |
| 11,476,981 B2 | 10/2022 | Wei et al. |
| 11,562,557 B2 | 1/2023 | Miginnis et al. |
| 11,587,148 B2 | 2/2023 | Elder |
| 11,593,552 B2 | 2/2023 | Sarkar |
| 11,609,956 B2 | 3/2023 | Mitali et al. |
| 11,625,930 B2 | 4/2023 | Rodriguez et al. |
| 11,810,383 B2 | 11/2023 | Patel et al. |
| 11,842,035 B2 | 12/2023 | Jahjah et al. |
| 2002/0037097 A1 | 3/2002 | Hoyos et al. |
| 2003/0185448 A1 | 10/2003 | Seeger et al. |
| 2006/0232619 A1 | 10/2006 | Otsuka et al. |
| 2006/0245650 A1 | 11/2006 | Jun |
| 2007/0033533 A1 | 2/2007 | Sull |
| 2007/0041642 A1 | 2/2007 | Romanoff et al. |
| 2008/0205759 A1 | 8/2008 | Zandifar et al. |
| 2009/0164422 A1 | 6/2009 | Pacella |
| 2010/0306080 A1 | 12/2010 | Trandal et al. |
| 2011/0122443 A1 | 5/2011 | Otsuka et al. |
| 2011/0243445 A1 | 10/2011 | Uzelac et al. |
| 2011/0289395 A1 | 11/2011 | Breuel et al. |
| 2011/0311145 A1 | 12/2011 | Bern et al. |
| 2012/0183211 A1 | 7/2012 | Hsu et al. |
| 2012/0274953 A1 | 11/2012 | Makabe |
| 2012/0330971 A1 | 12/2012 | Thomas et al. |
| 2013/0058575 A1 | 3/2013 | Koo et al. |
| 2013/0170741 A9 | 7/2013 | Hsu et al. |
| 2014/0002868 A1 | 1/2014 | Landa et al. |
| 2014/0064618 A1 | 3/2014 | Janssen, Jr. |
| 2014/0188647 A1 | 7/2014 | Argue |
| 2014/0195891 A1 | 7/2014 | Venkata Radha Krishna Rao et al. |
| 2015/0039479 A1 | 2/2015 | Gotanda |
| 2015/0127428 A1 | 5/2015 | Gharachorloo |
| 2015/0169951 A1 | 6/2015 | Khintsitskiy et al. |
| 2015/0254778 A1 | 9/2015 | Kmak et al. |
| 2015/0317642 A1 | 11/2015 | Argue |
| 2015/0363792 A1 | 12/2015 | Arini |
| 2015/0363822 A1 | 12/2015 | Rowe |
| 2016/0005189 A1 | 1/2016 | Gray |
| 2016/0034863 A1 | 2/2016 | Ross |
| 2016/0063469 A1 | 3/2016 | Etzion |
| 2016/0125383 A1 | 5/2016 | Chan et al. |
| 2016/0171585 A1 | 6/2016 | Singh |
| 2016/0203625 A1 | 7/2016 | Khan et al. |
| 2016/0210507 A1 | 7/2016 | Abdolahian |
| 2016/0234431 A1 | 8/2016 | Kraft et al. |
| 2016/0307059 A1 | 10/2016 | Caudhury et al. |
| 2016/0342863 A1 | 11/2016 | Kwon et al. |
| 2016/0350954 A1 | 12/2016 | Agarwala |
| 2017/0206536 A1 | 7/2017 | Brelig et al. |
| 2017/0293819 A1 | 10/2017 | Deng |
| 2018/0005345 A1 | 1/2018 | Apodaca et al. |
| 2018/0053045 A1 | 2/2018 | Lorenzini et al. |
| 2018/0060302 A1 | 3/2018 | Liang et al. |
| 2018/0317116 A1 | 11/2018 | Komissarov et al. |
| 2018/0336509 A1 | 11/2018 | Guttmann |
| 2019/0026803 A1 | 1/2019 | De Guzman |
| 2019/0050639 A1 | 2/2019 | Ast |
| 2019/0080207 A1 | 3/2019 | Chang |
| 2019/0130622 A1 | 5/2019 | Hoover |
| 2019/0171900 A1 | 6/2019 | Thrasher et al. |
| 2019/0244020 A1 | 8/2019 | Yoshino et al. |
| 2019/0272360 A1 | 9/2019 | Kursun |
| 2019/0325211 A1 | 10/2019 | Ordonez et al. |
| 2019/0332662 A1 | 10/2019 | Middendorf et al. |
| 2019/0354818 A1 | 11/2019 | Reisswig et al. |
| 2020/0097718 A1 | 3/2020 | Schäfer |
| 2020/0142856 A1 | 5/2020 | Neelamana |
| 2020/0151444 A1 | 5/2020 | Price et al. |
| 2020/0151902 A1 | 5/2020 | Almazán |
| 2020/0175267 A1 | 6/2020 | Schäfer et al. |
| 2020/0190963 A1 | 6/2020 | Gooneratne |
| 2020/0249803 A1 | 8/2020 | Sobel |
| 2020/0364451 A1 | 11/2020 | Ammar et al. |
| 2020/0401798 A1 | 12/2020 | Foncubierta Rodriguez et al. |
| 2020/0410231 A1 | 12/2020 | Chua et al. |
| 2021/0004880 A1 | 1/2021 | Benkreira et al. |
| 2021/0019287 A1 | 1/2021 | Prasad et al. |
| 2021/0034856 A1 | 2/2021 | Torres et al. |
| 2021/0090694 A1 | 3/2021 | Colley et al. |
| 2021/0117665 A1 | 4/2021 | Simantov et al. |
| 2021/0117668 A1 | 4/2021 | Zhong et al. |
| 2021/0142092 A1 | 5/2021 | Zhao et al. |
| 2021/0149926 A1 | 5/2021 | Komninos et al. |
| 2021/0158038 A1 | 5/2021 | Shanmuganathan et al. |
| 2021/0216765 A1 | 7/2021 | Xu |
| 2021/0248420 A1 | 8/2021 | Zhong et al. |
| 2021/0295101 A1 | 9/2021 | Tang et al. |
| 2021/0319217 A1 | 10/2021 | Wang et al. |
| 2021/0334737 A1 | 10/2021 | Balaji |
| 2021/0343030 A1 | 11/2021 | Sagonas et al. |
| 2021/0357710 A1 | 11/2021 | Zhang et al. |
| 2021/0406533 A1 | 12/2021 | Arroyo et al. |
| 2022/0004756 A1 | 1/2022 | Jennings |
| 2022/0114821 A1 | 4/2022 | Arroyo et al. |
| 2022/0180113 A1* | 6/2022 | Patel .................... G06V 10/28 |
| 2022/0189190 A1 | 6/2022 | Arroyo et al. |
| 2022/0198185 A1* | 6/2022 | Prebble .................. G06T 11/20 |
| 2022/0350946 A1 | 11/2022 | Hjerrild |
| 2022/0383651 A1 | 12/2022 | Shanmuganathan et al. |
| 2022/0397809 A1 | 12/2022 | Talpade et al. |
| 2022/0414630 A1 | 12/2022 | Yebes Torres et al. |
| 2023/0004748 A1 | 1/2023 | Rodriguez et al. |
| 2023/0005286 A1 | 1/2023 | Yebes Torres et al. |
| 2023/0008198 A1 | 1/2023 | Gadde et al. |
| 2023/0057687 A1* | 2/2023 | Mantri .................... G06F 21/31 |
| 2023/0196806 A1 | 6/2023 | Ramalingam et al. |
| 2023/0214899 A1 | 7/2023 | Martínez Cebrián et al. |
| 2023/0230408 A1 | 7/2023 | Arroyo et al. |
| 2023/0394859 A1 | 12/2023 | Montero et al. |
| 2024/0013562 A1 | 1/2024 | Montero |

FOREIGN PATENT DOCUMENTS

| | | |
|---|---|---|
| CN | 100369049 C | 2/2008 |
| CN | 103123685 A | 5/2013 |

(56) References Cited

FOREIGN PATENT DOCUMENTS

| | | |
|---|---|---|
| CN | 104866849 A | 8/2015 |
| CN | 108229397 A | 6/2018 |
| CN | 108829397 A | 11/2018 |
| CN | 109389124 A | 2/2019 |
| CN | 108229397 B | 8/2020 |
| CN | 112446351 A | 3/2021 |
| CN | 112560862 A | 3/2021 |
| CN | 112907973 B | 4/2023 |
| DE | 202013005144 U1 | 10/2013 |
| GB | 2595412 A | 11/2021 |
| JP | H0749529 A | 2/1995 |
| JP | H0749529 B2 | 2/1995 |
| JP | 2008210850 A | 9/2008 |
| JP | 2008211850 A | 9/2008 |
| JP | 2019139737 A | 8/2019 |
| JP | 7049529 B2 | 4/2022 |
| KR | 101831204 B1 | 2/2018 |
| TW | 200821850 A | 5/2008 |
| WO | 2013044145 A1 | 3/2013 |
| WO | 2018054326 A1 | 3/2018 |
| WO | 2018201423 A1 | 11/2018 |
| WO | 2020194004 A1 | 10/2020 |
| WO | 2022006295 A1 | 1/2022 |
| WO | 2022123199 A1 | 6/2022 |

OTHER PUBLICATIONS

DeepDive, "Distant Supervision," Online available on Stanford University website, retrieved on Apr. 1, 2022, 2 pages, [retrieved from: http://deepdive.stanford.edu/distant supervision].

Amazon, "Intelligent Document Processing," Amazon Web Services, https://aws.amazon.com/machine-learning/ml-use-cases/document-processing/fintech/.

Gopal et al., "What is Intelligent Document Processing?" Nano Net Technologies, 2023, https://nanonets.com/blog/intelligent-document-processing/.

Bojanowski et al., "Enriching Word Vectors with Subword Information," In Journal Transactions of the Association for Computational Linwstics, 2017, vol. 5, pp. 135-146, 12 pages.

Ray et al., "U-PC: Unsupervised Planogram Compliance," in European Conference on Computer Vision (ECCV), 2018, 15 pages. [retrieved from:http://openaccess.thecvf.com/content_ECCV_2018/papers/Archan_Ray_U-PC_Unsupervised Planogram ECCV 2018 paper.pdf].

Konda et al., "Magellan: Toward Building Entity Matching Management Systems Over Data Science Stacks," Proceedings of the VLDB Endowment, vol. 9, No. 13, pp. 1581-1584, 2016, 4 pages.

Levenshtein, "Binary Codes Capable of Correcting Deletions, Insertions, and Reversals," Soviet Physics—Doklady, Cybernetics and Control Theory, pp. 707-710, vol. 10, No. 8, Feb. 1966,4 pages.

Wick et al., "Calamari—A High-Performance Tensorflow-based Deep Learning Package for Optical Character Recognition," Digital Humanities Quarterly, 2020, 12 pages. [retrieved from:https://arxiv.org/ftp/arxiv/papers/1807/1807.02004.pdf].

Github, "Tesseract OCR" Tesseract Repository on GitHub, 2020, 3 pages. [available online, https://github.com/tesseract-ocr/].

Marinai, "Introduction to Document Analysis and Recognition," Machine Learning in Document Analysis and Recognition, 2008, 20 pages.

Krizhevsky et al., "ImageNet Classification with Deep Convolutional Neural Networks," In International Conference on Neural Information Processing Systems (NIPS), 2012, 9 pages.

Kim et al., "Character-Aware Neural Language Models," Proceedings of the Thirtieth AAAI Conference on Artificial Intelligence (AAAI'IO), pp. 2741-2749, 2016, 9 pages.

Smith et al., "Identification of Common Molecular Subsequences," Reprinted Journal of Molecular Biology, Academic Press Inc. (London) Ltd., pp. 195-197, 1981, 3 pages.

Govindan et al., "Character Recognition—A Review," Pattern Recognition, vol. 23, No. 7, pp. 671-683, Jul. 20, 1990, 13 pages.

Poulovassilis et al. "A nested-graph model for the representation and manipulation of complex objects." ACM Trans. Inf. Syst. 12 (1994): 34 pages.

Hochreiter et al. "Long Short-Term Memory." Neural Computation 9 (1997): 1735-1780, 46 Pages.

Ng et al. "On Spectral Clustering: Analysis and an algorithm." NIPS (2001).

Lowe, "Distinctive Image Features from Scale-Invariant Key points," International Journal of Computer Vision (HCV), Jan. 5, 2004, 20 pages.

Vogel et al., "Parallel Implementations of Word Alignment Tool," Software Engineering, Testing, and Quality Assurance for Natural Language Processing, nn. 49-57, Jun. 2008, 10 pages.

O'Gorman et al., "Document Image Analysis," IEEE Computer Society Executive Briefings, 2009, 125 pages.

Chung et al. "Empirical Evaluation of Gated Recurrent Neural Networks on Sequence Modeling." ArXiv abs/1412.3555 (2014): n. pag.

Nshuti, "Mobile Scanner and OCR (A First Step Towards Receipt to Spreadsheet)," 2015, 3 pages.

Ronneberger et al., "U-Net: Convolutional Networks for Biomedical Image Segmentation," Medical Image Computing and Computer-Assisted Intervention (MICCAI), May 18, 2015, 8 pages.

Lecun et al., "Deep Learning," Nature, vol. 521, pp. 436-444, May 28, 2015, 9 pages.

Genereux et al., "NLP Challenges in Dealing with OCR-ed Documents of Derogated Quality, "Workshop on Replicability and Reproducibility in Natural Language Processing: adaptive methods,resources and software at HCAI 2015, Jul. 2015, 6 pages.

Ren et al., "Faster R-CNN: Towards Real-Time Object Detection with Region Proposal Networks," In International Conference on Neural Information Processing Systems (NIPS), pp. 91-99, Jan. 6, 2016, 14 pages.

Osindero et al., "Recursive Recurrent Nets with Attention Modeling for OCR in the Wild," in Conference on Computer Vision and Pattern Recognition (CVPR), Mar. 9, 2016, 10 pages.

Redmon et al., "You Only Look Once: Unified, Real-Time Object Detection," In Conference on Computer Vision and Pattern Recognition (CVPR), May 9, 2016, 10 pages.

Kipf et al. "Semi-Supervised Classification with Graph Convolutional Networks." ArXiv abs/1609.02907 (2017): 14 Pages.

Ozhiganov et al., "Deep Dive Into OCR for Receipt Recognition," DZone, Jun. 21, 2017, 18 pages.

Bartz et at, "STN-OCT: A Single Neural Network for Text Detection and Text Recognition," Computer Vision and Pattern Recognition, Jul. 27, 2017, 9 pages.

Vaswani et al., "Attention is all you need," In Advances in Neural Information Processing Systems,31st Conference on Neural Information Processing Systems (NIPS 2017), Long Beach, CA, last revised Dec. 6, 2017, 15 pages.

Follmann et al., "MVTec D2S: Densely Segmented Supermarket Dataset". In European Conference on Computer Vision (ECCV), 2018, 17 pages.

Yadati et al. "HyperGCN: Hypergraph Convolutional Networks for Semi-Supervised Classification." ArXiv abs/1809.02589 (2018), 23 Pages.

Elfwing et al. "Sigmoid-Weighted Linear Units for Neural Network Function Approximation in Reinforcement Learning." Neural networks: the official journal of the International Neural Network Society 107 (2018): 3-11.

Velickovic et al. "Graph Attention Networks." ArXiv abs/1710.10903 (2018).

Mudgal et al., "Deep learning for entity matching: A design space exploration," in Proceedings of the 2018 International Conference on Management of Data, Jun. 10-15, 2018, Houston, TX, 16 pages.

Akbik et al., "Contextual String Embeddings for Sequence Labeling," In Proceedings of the 27th International Conference on Computational Linguistics (COLING), Aug. 2018, 12 pages.

Li et al., "Extracting Figures and Captions from Scientific Publications," Short Paper, CIKM18, Oct. 22-26, 2018, Torino, Italy, 4 pages.

(56) References Cited

OTHER PUBLICATIONS

Huang et al.., "Mask R-CNN with Pyramid Attention Network for Scene Text Detection", arXiv:1811.09058v1, pp. 1-9, https://arxiv.org/abs/1811.09058, Nov. 22, 2018, 9 pages.
Wikipedia, "Precision & Recall," Dec. 17, 2018 revision, 12 pages.
Liu et al. "ROBERTa: A Robustly Optimized BERT Pretraining Approach." ArXiv abs/1907.11692 (2019): , 13 Pages.
Loshchilov et al., "Decoupled Weight Decay Regularization." ICLR (2019). 19 Pages.
Hu et al., "Semi-supervised Node Classification via Hierarchical Graph Convolutional Networks." ArXiv abs/1902.06667 (2019), 8 Pages.
Artificial Intelligence & Image Analysis, "Historic Document Conversion," Industry Paper, accessed on Jan. 30, 2019, 4 pages.
Artificial Intelligence & Image Analysis, "Intelligent Automation Eliminates Manual Data Entry From Complex Documents," White Paper, accessed on Jan. 30, 2019, 3 pages.
Guillaume et al., "FUNSD: A dataset for form understanding in noisy scanned documents", in International Conference on Document Analysis and Recognition (ICDAR), 2019.
Devlin et al., "BERT: Pre-training of Deep Bidirectional Transformers for Language Understanding," In Conference of the North American Chapter of the Association for Computational Linguistics (NAACL-HLT), Jun. 24, 2019, 16 pages.
Qasim et al., "Rethinking Table Recognition using Graph Neural Networks," In InternationalConference on Document Analysis and Recognition (ICDAR), Jul. 3, 2019, 6 pages.
Visich, "Bar Codes and Their Applications," Research Foundation of State University of New York, 1990, 59 pages.
European Patent Office, "Communication Pursuant to Article 94(3) EPC," issued in connection with European Patent Application No. 19921870.2, dated Apr. 9, 2024, 7 pages.
United States Patent and Trademark Office, "Supplemental Notice of Allowability," issued in connection with U.S. Appl. No. 17/710,538, dated May 8, 2024, 3 pages.
Canadian Intellectual Property Office, "Examiner requisition," issued in connection with Canadian Patent Application No. 3,182,471, dated May 28, 2024, 5 pages.
United States Patent and Trademark Office, "Corrected Notice of Allowability," issued in connection with U.S. Appl. No. 17/598,792, dated Jul. 3, 2024, 2 pages.
United States Patent and Trademark Office, "Final Office Action," issued in connection with U.S. Appl. No. 17/566,135, dated Jul. 25, 2024, 17 pages.
United States Patent and Trademark Office, "Final Office Action," issued in connection with U.S. Appl. No. 18/476,978, dated Aug. 14, 2024, 22 pages.
United States Patent and Trademark Office, "Notice of Allowance and Fee(s) Due," issued in connection with U.S. Appl. No. 17/710,538, dated Aug. 14, 2024, 8 pages.
Feng et al., "Computer vision algorithms and hardware implementations: A Survey," Integration: the VLSI Journal, vol. 69, pp. 309-320, https://www.sciencedirect.com/science/article/pii/S0167926019301762, accepted Jul. 27, 2019, 12 pages.
Oliveira et al., "dhSegment: A generic deep-learning approach for document segmentation," In 16th International Conference on Frontiers in Handwriting Recognition (ICFHR), Aug. 14, 2019, 6 pages.
Zhong et al., "PubLayNet: largest dataset ever for document layout analysis," In International Conference on Document Analysis and Recognition (ICDAR), Aug. 16, 2019, 8 pages.
International Searching Authority, "International Search Report and Written Opinion," issued in connection with PCT application No. PCT/IB2019/000299 dated Dec. 23, 2019, 7 pages.
Dwivedi et al., "Benchmarking Graph Neural Networks." ArXiv abs/2003.00982 (2020): n. 49 pages.
Bandyopadhyay et al., "Hypergraph Attention Isomorphism Network by Learning Line Graph Expansion." 2020 IEEE International Conference on Big Data (Big Data) (2020): 669-678, 10 pages.
Carbonell et al., "Named Entity Recognition and Relation Extraction with Graph Neural Networks in Semi Structured Documents", in International Conference on Pattern Recognition (ICPR), pp. 9622-9627, 2021, 6 pages.
Zhu et al., "Heterogeneous Mini-Graph Neural Network and Its Application to Fraud Invitation Detection." 2020 IEEE International Conference on Data Mining (ICDM) (2020): 891-899. 6 pages.
Zhong et al., "Hierarchical Message-Passing Graph Neural Networks." ArXiv abs/2009.03717 (2020), 28 pages.
Chen et al., "HGMF: Heterogeneous Graph-based Fusion for Multimodal Data with Incompleteness." Proceedings of the 26th ACM SIGKDD International Conference on Knowledge Discovery & Data Mining (2020), 11 pages.
Dong et al., "HNHN: Hypergraph Networks with Hyperedge Neurons." ArXiv abs/2006.12278 (2020), 11 pages.
Zacharias et al., "Image Processing Based Scene-Text Detection and Recognition with Tesseract," arXiv (CoRR), Apr. 17, 2020, 6 pages. [retrieved from: https://arxiv.org/pdf/2004.08079.pdf], 6 pages.
Hui, "mAP (mean Average Precision) for Object Detection," Mar. 6, 2018, 2 pages. Retrieved from [https://medium.eom/@jonathan hui/map-mean-average-precision-for-object-detection-45c121a311731 on May 11, 2020, 2 pages.
Xu et al., "LayoutLM: Pre-training of Text and Layout for Document Image Understanding," in International Conference on Knowledge Discovery & Data Mining (SIGKDD), Jun. 16, 2020, 9 pages. [retrieved from: https://arxiv.org/pdf/1912.13318.pdf], 9 pages.
Yu et al., "PICK: Processing Key Information Extraction from Documents using Improved Graph Learning-Convolutional Networks," in International Conference on Pattern Recognition (ICPR), Jul. 18, 2020, 8 pages. [retrieved from: https://arxiv.org/pdf/2004.07464.pdf], 8 pages.
Wang et al., "DocStruct: A Multimodal Method to Extract Hierarchy Structure in Document for General Form Understanding", in Empirical Methods in Natural Language Processing (EMNLP), pp. 898-908, 2020, 11 pages.
Arroyo et al., "Multi-label classification of promotions in digital leaflets using textual and visual information," Proceedings of the Workshop on Natural Language Processing in E-Commerce (EComNLP), pp. 11-20, Barcelona, Spain (Online), Dec. 12, 2020, 10 pages.
Garncarek et al., "LAMBERT: Layout-Aware Language Modeling for Information Extraction." ICDAR (2021). 16 pages.
Gu et al., "UniDoc: Unified Pretraining Framework for Document Understanding." NeurIPS (2021). "UniDoc: Unified Pretraining Framework for Document Understanding." NeurIPS (2021). 12 pages.
Ma et al., "Graph Attention Networks with Positional Embeddings." ArXiv abs/2105.04037 (2021): 13 pages.
Xu et al., "LayoutLMv2: Multi-modal Pre-training for Visually-rich Document Understanding." ACL (2021), 13 pages.
Li et al., "StructuralLM: Structural Pre-training for Form Understanding." ArXiv abs/2105.11210 (2021), 10 pages.
Li et al. "SelfDoc: Self-Supervised Document Representation Learning." 2021 IEEE/CVF Conference on Computer Vision and Pattern Recognition (CVPR) (2021): 5648-5656, 10 pages.
Powalski et al., "Going Full-TILT Boogie on Document Understanding with Text-Image-Layout Transformer." ICDAR (2021), 18 pages.
Prabhu et al., "MTL-FoUn: A Multi-Task Learning Approach to Form Understanding", in International Conference on Document Analysis and Recognition (ICDAR), pp. 377-388, 2021, 5 pages.
Xu et al., "LayoutXLM: Multimodal Pre-training for Multilingual Visually-rich Document Understanding", arXiv, 2021, 10 pages.
Li et al.,"StrucTexT: Structured Text Understanding with Multi-Modal Transformers", in ACM International Conference on Multimedia (ACM Multimedia), pp. 1912-1920. 2021, 9 pages.
Tang et al., "MatchVIE: Exploiting Match Relevancy between Entities for Visual Information Extraction", in International Joint Conference on Artificial Intelligence (IJCAI), pp. 1039-1045, 2021, 7 pages.
Zhang et al., "Entity Relation Extraction as Dependency Parsing in Visually Rich Documents", in Empirical Methods in Natural Language Processing (EMNLP), 2021, 10 pages.

(56) References Cited

OTHER PUBLICATIONS

Nguyen Dang et al., "End-to-End Hierarchical Relation Extraction for Generic Form Understanding", in International Conference on Pattern Recognition (ICPR), pp. 5238-5245., 2021, 8 pages.
Davis et al., "Visual FUDGE: Form Understanding via Dynamic Graph Editing", in International Conference on Document Analysis and Recognition (ICDAR), 2021, 16 pages.
Hwang et al., "Cost-effective End-to-end Information Extraction for Semi-structured Document Images", in Empirical Methods in Natural Language Processing (EMNLP), 2021, 9 pages.
Villota et al., "Text Classification Models for Form Entity Linking", arXiv, 2021, 10 pages.
Huang et al., "UniGNN: a Unified Framework for Graph and Hypergraph Neural Networks." IJCAI (2021), 9 pages.
Kim et al., "Donut: Document Understanding Transformer without OCR", arXiv, 2021, 29 pages.
Qian et al., "A region-based hypergraph network for joint entity-relation extraction", in Knowledge-Based Systems. Vol 228, 2021, 8 pages.
International Searching Authority, "International Search Report," issued in connection with PCT No. PCT/US2020/061269, Mar. 11, 2021, 3 pages.
International Searching Authority, "Written Opinion," issued in connection with PCT No. PCT/US2020/061269, Mar. 11, 2021, 4 pages.
United States Patent and Trademark Office, "Non-Final Office Action," issued in connection with U.S. Appl. No. 16/692,797, issued Mar. 16, 2021, 12 pages.
Google, "Detect Text in Images," Retrieved from http://cloud.google.com/vision/docs/ocr, Mar. 29, 2021, 16 pages.
Chen et al., "TextPolar: irregular scene text detection using polar representation," International Journal on Document Analysis and Recognition (IJDAR), May 23, 2021, 9 pages.
Shen et al., "LayoutParser: A Unified Toolkit for Deep Learning Based Document Image Analysis," in International Conference on Document Analysis and Recognition (ICDAR), Jun. 1, 2021, 16 pages.
Hwang et al., "Spatial Dependency Parsing for Semi-Structured Document Information Extraction," in International Joint Conference on Natural Language Processing (IJCNLP), Jul. 1, 2021, 14 pages.
Hong et al., "BROS: A Pre-trained Language Model Focusing on Text and Layout for Better Key Information Extraction from Documents," arXiv (CoRR), Sep. 10, 2021, 13 pages.
Appalaraju et al., "DocFormer: End-to-End Transformer for Document Understanding," arXiv (CoRR), Sep. 20, 2021, 22 pages.
International Bureau, "International Preliminary Report on Patentability," issued in connection with PCT No. PCT/IB2019/000299, Sep. 28, 2021, 5 pages.
United States Patent and Trademark Office, "Final Office Action," issued in connection with U.S. Appl. No. 16/692,797, issued Oct. 27, 2021, 14 pages.
International Searching Authority, "Written Opinion of the International Searching Authority," issued in connection with PCT No. PCT/US2021/039931, Nov. 4, 2021, 4 pages.
International Searching Authority, "International Search Report," issued in connection with PCT No. PCT/US2021/039931, Nov. 4, 2021, 3 pages.
Huang et al. "LayoutLMv3: Pre-training for Document AI with Unified Text and Image Masking." ArXiv abs/2204.08387 (2022), 10 pages.
Leicester et al., "Using Scanner Technology to Collect Expenditure Data," Fiscal Studies, vol. 30, Issue 3-4, 2009, 29 pages.
Oliveira et al., "A New Method for Text-Line Segmentation for Warped Documents," International Conference Image Analysis and Recognition, Jun. 21, 2010, 11 pages.
Joulin et al., "Bag of Tricks for Efficient Text Classification," Proceedings of the 15th Conference of the European Chapter of the Association for Computational Linguistics, Aug. 9, 2016, 5 pages.
Nathancy, "How do I make masks to set all of image background, except the text, to white?", stackoverflow.com, https://stackoverflow.com/questions/56465359/how-do-i-make-masks-to-set-all-of-image-background-except-the-text-to-white, Jun. 5, 2019, 5 pages.
Qian et al., "A Region-Based Hypergraph Network for Joint Entity-Relation Extraction," Knowledge-Based Systems. vol. 228, Sep. 2021, 8 pages.
International Searching Authority, "International Search Report," issued in connection with PCT No. PCT/US2022/034570, dated Jun. 22, 2022, 3 pages.
International Searching Authority, "Written Opinion," issued in connection with PCT No. PCT/US2022/034570, dated Jun. 22, 2022, 5 pages.
International Searching Authority, "International Search Report," issued in connection with PCT No. PCT/US2023/011859, mailed on Jun. 1, 2023, 3 pages.
International Searching Authority, "Written Opinion," issued in connection with PCT No. PCT/US2023/011859, mailed on Jun. 1, 2023, 4 pages.
United States Patent and Trademark Office, "Advisory Action," issued in connection with U.S. Appl. No. 17/379,280, mailed on Jul. 18, 2023, 3 pages.
United States Patent and Trademark Office, "Corrected Notice of Allowability," issued in connection with U.S. Appl. No. 17/345,940, dated Jul. 20, 2023, 3 pages.
Canadian Intellectual Property Office, "Examiner's Report," issued in connection with Canadian Patent Application No. 3,124,868, dated Aug. 10, 2023, 5 pages.
United States Patent and Trademark Office, "Corrected Notice of Allowability," issued in connection with U.S. Appl. No. 17/883,309, mailed on Aug. 17, 2023, 2 Pages.
Intellectual Property of United Kingdom, "Notification of Grant ," issued in connection with United Kingdom Patent Application No. 2112299.9, mailed on Aug. 29, 2023, 2 Pages.
United States Patent and Trademark Office, "Corrected Notice of Allowability," issued in connection with U.S. Appl. No. 17/075,675, mailed on Oct. 10, 2023, 2 pages.
United States Patent and Trademark Office, "Non-Final Office Action, " issued in connection with U.S. Appl. No. 17/710,538, dated Oct. 26, 2023, 6 Pages.
European Patent Office, "Extended European Search Report," issued in connection with European Patent Application No. 20891012.5, dated Nov. 17, 2023, 12 pages.
United States Patent and Trademark Office, "Non-Final Office Action," issued in connection with U.S. Appl. No. 17/598,792, dated Dec. 29, 2023, 17 pages.
International Searching Authority, "International Preliminary Report on Patentability," issued in connection with International Patent Application No. PCT/US2022/034570, issued on Jan. 4, 2024, 7 pages.
United States Patent and Trademark Office, "Non-Final Office Action," issued in connection with U.S. Appl. No. 18/191,642, dated Feb. 7, 2024, 18 pages.
United States and Patent and Trademark Office, "Non-Final Office Action," issued in connection with U.S. Appl. No. 17/566,135, dated Mar. 27, 2024, 13 pages.
European Patent Office, "Communication pursuant to Article 94(3) EPC," issued in connection with European Patent Application No. 19 921 870.2-1207, on Apr. 9, 2024, 7 pages.
United States Patent and Trademark Office, "Non-Final Office Action," issued in connection with U.S. Appl. No. 18/476,978, dated Apr. 18, 2024, 20 pages.
United States Patent and Trademark Office, "Notice of Allowance and Fee(s) Due," issued in connection with U.S. Appl. No. 17/710,538, dated Apr. 19, 2024, 8 pages.
United States Patent and Trademark Office, "Non-Final Office Action," issued in connection with U.S. Appl. No. 17/710,660, on May 28, 2024, 9 pages.
United States Patent and Trademark Office, "Notice of Allowance and Fee(s) Due," issued in connection with U.S. Appl. No. 17/598,792, dated Jun. 17, 2024, 9 pages.

(56) References Cited

OTHER PUBLICATIONS

Park et al., "CORD: A Consolidated Receipt Dataset for Post-OCR Parsing. In Workshop on Document Intelligence," at NeurIPS 201, 4 pages.

Zhangxuan et al. "XYLayoutLM: Towards Layout-Aware Multimodal Networks For Visually-Rich Document Understanding", in Conference on Computer Vision and Pattern Recognition (CVPR), 2022, 10 pages.

Zhang et al., "Multimodal Pre-training Based on Graph Attention Network for Document Understanding." ArXiv abs/2203.13530 (2022), 13 pages.

Wang et al. "LiLT: A Simple yet Effective Language-Independent Layout Transformer for Structured Document Understanding", in Annual Meeting of the Association for Computational Linguistics (ACL), 2022, 11 pages.

United States Patent and Trademark Office, "Advisory Action", issued in connection with U.S. Appl. No. 16/692,797, dated Feb. 16, 2022, 2 pages.

Intellectual Property Office of United Kingdom, "Intention to Grant under Section 18(4)," issued in connection with British Patent Application GB2112299.9, mailed on Jul. 13, 2023, 2 Pages.

United States Patent and Trademark Office, "Notice of Allowance," issued in connection with U.S. Appl. No. 17/345,940, dated Jul. 7, 2023, 8 pages.

United States Patent and Trademark Office, "Notice of Allowance," issued in connection with U.S. Appl. No. 17/075,675, issued Jun. 26, 2023, 3 pages.

Nielseniq "Nielsen Brandbank Product Library," Online Available. Retrieved on Apr. 1, 2022, 3 pages.

Datasetlist, "Labeling tools-List of labeling tools," Datasetlist.com, updated Dec. 2021, downloaded on Apr. 1, 2022, 14 pages.

United States Patent and Trademark Office, "Advisory Action," issued in connection with U.S. Appl. No. 17/075,675, issued May 30, 2023, 3 pages.

Github, "Fiat tool—Fast Image Data Annotation Tool," Github.com, downloaded on Apr. 1, 2022, 30 pages.

United States Patent and Trademark Office, "Notice of Allowance and Fee(s) Due," issued in connection with U.S. Appl. No. 16/692,797, issued Apr. 5, 2022, 10 pages.

Github, "Doccano tool," Github.com, downloaded on Apr. 11, 2022, 12 pages.

United States Patent and Trademark Office, "Corrected Notice of Allowability", issued in connection with U.S. Appl. No. 16/692,797, issued Apr. 22, 2022, 3 pages.

International Bureau, "International Preliminary Report on Patentability," issued in connection with PCT No. PCT/US2020/061269, May 17, 2022, 5 pages.

Patent Cooperation Treaty, "International Search Report," issued in connection with PCT No. PCT/US2022/034570, Jun. 22, 2022, 3 pages.

International Searching Authority, "Written Opinion," issued in connection with PCT No. PCT/US2022/034570, Jun. 22, 2022, 5 pages.

Datasetlist, "A tool using OpenCV to annotate images for image classification, optical character reading, . . . ," Datasetlist.com, dated Jul. 13, 2022, 30 pages.

United States Patent and Trademark Office, "Non-Final Office Action," issued in connection with U.S. Appl. No. 17/345,940, dated Aug. 18, 2022, 8 Pages.

Crandall et al., "Extraction of special effects caption text events from digital video," IJDAR, Department of Computer Science and Engineering, The Pennsylvania State University, 202 Pond Laboratory, Universirty Park, PA, Accepted Sep. 13, 2022, pp. 138-157, 20 pages.

United States Patent and Trademark Office, "Non-Final Office Action," issued in connection with U.S. Appl. No. 17/075,675 issued Sep. 22, 2022 12 pages.

European Patent Office, "Extended Search Report," issued in connection with European Patent Appl. No. 19921870.2, dated Oct. 12, 2022, 11 pages.

International Searching Authority, "International Search Report and Written Opinion," mailed in connection with International Patent Application No. PCT/US2022/034570, on Oct. 20, 2022, 8 pages.

Instituto Mexicano De La Propiedad Industrial, "Representation of the Promotion Sent Through the Online Patent System," in connection with Mexican Patent Application No. MX/a/2022/008170, issued Oct. 27, 2022, 35 pages. (Partial Machine Translation).

United States Patent and Trademark Office, "Notice of Allowance," issued in connection with U.S. Appl. No. 17/364,419, filed Nov. 4, 2022, 10 pages.

Canadian Patent Office, "Examiner's Report," issued in connection with Canadian Patent Application No. 3,124,868 , mailed on Nov. 10, 2022,4 pages.

United States Patent and Trademark Office, "Corrected Notice of Allowability", issued in connection with U.S. Appl. No. 17/364,419, Nov. 15, 2022, 2 pages.

European Patent Office, "European Search Report," issued in connection with European patent appl. No. 22180113.7-1207, Nov. 22, 2022, 31 pages.

European Patent Office, "European Search Report," issued in connection with Application No. 22184405.3, dated Dec. 2, 2022, 2 pages.

United States Patent and Trademark Office, "Non-Final Office Action", issued in connection with U.S. Appl. No. 17/379,280, dated Dec. 2, 2022, 14 pages.

European Patent Office, "Extended European Search Report," issued in connection with European patent appl. No. 22184405.3-1207, Dec. 2, 2022, 7 pages.

International Bureau, "International Preliminary Report on Patentability," issued in connection with PCT No. PCT/US2021/039931, Dec. 13, 2022, 5 pages.

United States Patent and Trademark Office, "Corrected Notice of Allowability", issued in connection with U.S. Appl. No. 17/364,419, Jan. 4, 2023, 2 pages.

International Bureau "International Preliminary Report on Patentability," issued in connection with PCT No. PCT/US2021/039931, Jan. 12, 2023, 6 pages.

United States Patent and Trademark Office, "Non-Final Office Action", issued in connection with U.S. Appl. No. 17/883,309, filed Jan. 20, 2023, 14 pages.

United States Patent and Trademark Office, "Corrected Notice of Allowability", issued in connection with U.S. Appl. No. 17/364,419, Feb. 15, 2023, 2 pages.

European Patent Office, "Extended European Search Report," issued in connection with European Patent Application No. 22214553.4, dated May 17, 2023, 9 pages.

United States and Patent and Trademark Office, "Corrected Notice of Allowance and Fee(s) Due," issued in connection with U.S. Appl. No. 17/883,309, dated May 11, 2023, 9 pages.

United Kingdom Patent Office, "Examination Report under section 18(3)," issued in connection with GB Application No. 2112299.9, dated Feb. 17, 2023, 2 pages.

United States Patent and Trademark Office, "Final Office Action," issued in connection with U.S. Appl. No. 17/075,675, issued Mar. 7, 2023, 11 pages.

United States Patent and Trademark Office, "Non-Final Office Action," issued in connection with U.S. Appl. No. 17/345,940, dated Mar. 16, 2023, 13 Pages.

United States Patent and Trademark Office, "Final Office Action," issued in connection with U.S. Appl. No. 17/379,280, dated May 5, 2023, 17 pages.

International Searching Authority, "International Preliminary Report on Patentability," issued in connection with International Application No. PCT/US2023/011859, mailed on Aug. 15, 2024, 6 pages.

United States Patent and Trademark Office, "Notice of Allowance and Fee(s) Due," issued in connection with U.S. Appl. No. 17/598,792, dated Aug. 27, 2024, 9 pages.

United States Patent and Trademark Office, "Notice of Allowance and Fee(s) Due," issued in connection with U.S. Appl. No. 18/191,642, dated Aug. 28, 2024, 7 pages.

United States Patent and Trademark Office, "Notice of Allowance and Fee(s) Due," issued in connection with U.S. Appl. No. 17/710,538, dated Sep. 11, 2024, 3 pages.

(56) References Cited

OTHER PUBLICATIONS

United States Patent and Trademark Office, "Non-Final Office Action," issued in connection with U.S. Appl. No. 17/710,649, dated Sep. 16, 2024, 12 pages.

United States Patent and Trademark Office, "Notice of Allowance and Fee(s) Due," issued in connection with U.S. Appl. No. 17/710,660, dated Sep. 25, 2024, 9 pages.

United States Patent and Trademark Office, "Advisory Action," issued in connection with U.S. Appl. No. 18/476,978, dated Oct. 7, 2024, 3 pages.

United States Patent and Trademark Office, "Notice of Allowance and Fee(s) Due," issued in connection with U.S. Appl. No. 17/566,135, dated Oct. 11, 2024, 9 pages.

United States Patent and Trademark Office, "Notice of Allowability," issued in connection with U.S. Appl. No. 17/710,538, dated Nov. 20, 2024, 3 pages.

United States Patent and Trademark Office, "Notice of Allowance and Fee(s) Due," issued in connection with U.S. Appl. No. 18/476,978, dated Dec. 13, 2024, 11 pages.

European Patent Office, "Communication pursuant to Article 94(3) EPC," issued in connection with European Patent Application No. 22214553.4, dated Jan. 7, 2025 2 pages.

European Patent Office, "Communication pursuant to Article 94(3) EPC," issued in connection with European Patent Application No. 22180113.7-1207, Jan. 7, 2025, 6 pages.

European Patent Office, "Communication pursuant to Article 94(3) EPC," issued in connection with European Patent Application No. 22180113.7, Jan. 7, 2025, 6 pages.

United States Patent and Trademark Office, "Second Corrected Notice of Allowability," issued in connection with U.S. Appl. No. 18/191,642, dated Nov. 22, 2024, 2 pages.

United States Patent and Trademark Office, "Corrected Notice of Allowability," issued in connection with U.S. Appl. No. 17/598,792, dated Dec. 5, 2024, 2 pages.

United States Patent and Trademark Office, "Notice of Allowance and Fee(s) Due," issued in connection with U.S. Appl. No. 18/148,947, dated Jan. 8, 2025, 12 pages.

United States Patent and Trademark Office, "Notice of Allowance and Fee(s) Due," issued in connection with U.S. Appl. No. 17/710,649, dated Jan. 16, 2025, 9 pages.

United States Patent and Trademark Office, "Notice of Allowance and Fee(s) Due," issued in connection with U.S. Appl. No. 17/872,801, dated Jan. 30, 2025, 13 pages.

* cited by examiner

METHODS, SYSTEMS, ARTICLES OF MANUFACTURE AND APPARATUS TO EXTRACT REGION OF INTEREST TEXT FROM RECEIPTS

FIELD OF THE DISCLOSURE

This disclosure relates generally to image and/or text processing, and, more particularly, to methods, systems, articles of manufacture and apparatus to extract region of interest text from receipts.

RELATED APPLICATION

This patent claims the benefit of U.S. Provisional Patent Application No. 63/292,973, which was filed on Dec. 22, 2021. U.S. Provisional Patent Application No. 63/292,973 is hereby incorporated herein by reference in its entirety. Priority to U.S. Provisional Patent Application No. 63/292,973 is hereby claimed.

BACKGROUND

In recent years, digital analysis of retail processes has grown rapidly. Receipts are an informative mark of transaction for retail processes and are often retained for record-keeping purposes, etc. A receipt may contain information such as a location of purchase, time of purchase, item(s) purchased, price, and/or any other information regarding a transaction which is collected and analyzed for inventory, store performance, trend forecasting, etc.

Figure 1:
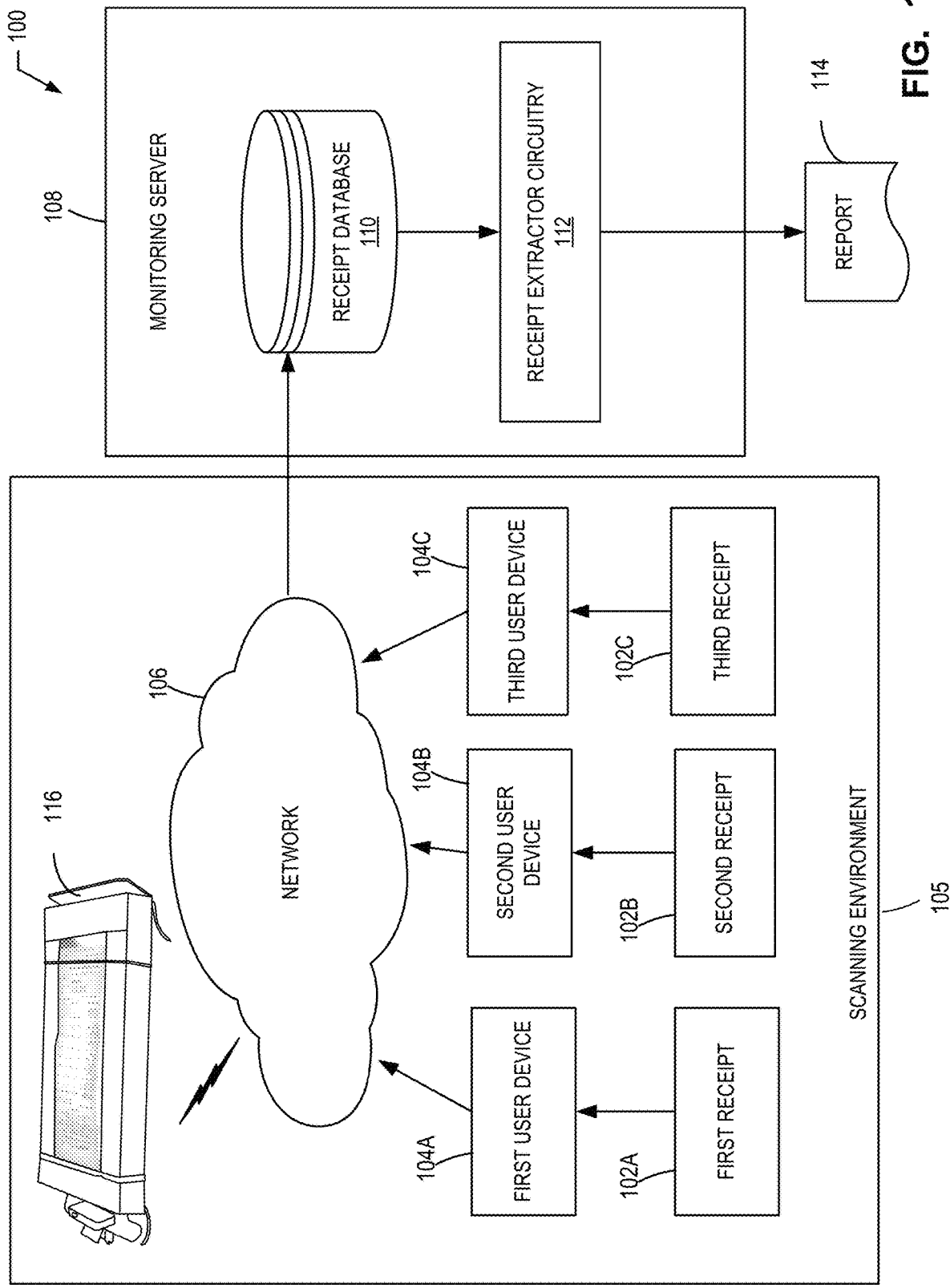
FIG. 1 is a block diagram of an example environment in which an input image from at least one receipt within a scanning environment is obtained by a monitoring server to extract receipt images and identify text within region(s) of interest.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

When a receipt is provided to mark the completion of a transaction, it is often retained for bookkeeping purposes, etc. These receipts often contain information within a region of interest (e.g., a final sale cost, list of items purchased, etc.) that is helpful for store performance analysis, inventory data, market strategy development, etc. In the technical field of market research, a physical receipt has limited scope for application in digital analysis processes due to an inability to efficiently perform region of interest text extraction on the receipt, especially when multiple physical receipts are used for high-volume data collection.

Current approaches to perform region of interest text extraction on receipts require manual examination and/or manual extraction (e.g., reading through each receipt, hand-noting transactional information, etc.), which prove to be unhelpful for applications wherein multiple receipts must be analyzed rapidly. Additionally, the typical manual approach results in substantial error in collected data that is caused by, in part, human error, human fatigue and/or human discretion when attempting to identify information and/or select candidate regions of interest that might be relevant. Stated differently, human discretion is a conclusion, selection and/or decision made by human judgement, in which such judgement does not necessarily consider objective factual information, thereby resulting in erroneous answers to any effort of examining receipts for information useful to market analysts. Furthermore, manual approach results are further characterized by computational inefficiencies resulting from use of receipts and/or receipt images that are difficult to read. For example, use of low contrast receipt images and/or receipts (e.g., receipts and/or receipt images including light colored text against a white background) requires further manual effort to discern text within a proposed region of interest.

Example methods, systems, articles of manufacture and apparatus disclosed herein obtain an input receipt image and process the input to extract the text in a region of interest (e.g., through an automated process). Having the ability to perform region of interest text extraction on these physical receipts facilitates improvements in the technical field of market research, such as allowing for the capacity to predict product trends, analyze customer habits, etc. for use in advertising, inventory planning, etc. Examples disclosed herein utilize image processing techniques such as, for example, image segmentation (e.g., K-Means data clustering), image pixel format conversions (e.g., conversion from RGB to HSV pixels), image contour detection, etc.

In some examples, a region of interest (ROI) includes portions of an image that include respective categories of classes of information, such as text information, graphics information, logo imagery, price information, item description information, etc.

FIG. 1 illustrates an example receipt text extraction system 100, in accordance with the teachings of this disclosure, communicatively connected to an example scanning environment 105. The example network 106 includes an example first receipt 102A, an example second receipt 102B, and an example third receipt 102C, an example set of user devices (e.g., an example first user device 104A, an example second user device 104B, and an example third user device 104C), an example monitoring server 108, and an example receipt image capturing device 116. The example monitoring server 108 includes an example receipt database 110, associated with example receipt extractor circuitry 112, that is capable of generating an example report 114.

In examples disclosed herein, the example first, second, and/or third user devices, 104A, 104B, and/or 104C, respectively, may include any type of camera, scanning device, etc. capable of capturing an image of the example first, second, and/or third receipts, 102A, 102B, and/or 102C, respectively. In some examples, the first, second, and/or third user devices 104A, 104B, and/or 104C may be directly linked to the receipt extractor circuitry 112, eliminating the need for the network 106 and/or the receipt database 110 within the monitoring server 108. Additionally, in some examples, one or more of the first, second, and/or third user devices 104A, 104B, and/or 104C, respectively, may utilize the example receipt image capturing device 116.

The example receipt image capturing device 116 is an image capturing device that utilizes colored markers, LED lighting, and/or a dark background to capture receipt images without glare, reflection, and/or any other forms of image noise. Alternatively, any other type of camera or image capture device (e.g., infrared cameras, fixed-mounted cameras, portable cameras, user-carried cameras, etc.), such as the example first user device 104A, the example second user device 104B, and/or the example third user device 104C, may be utilized to provide an input receipt image to the example receipt extractor circuitry 112 for ROI text extraction (e.g., the example first user device 104A, the example second user device 104B, and the example third user device 104C). In examples disclosed herein, the example receipt image capturing device 116 may capture an image of a whole receipt and/or any portion of the receipt for use by the example monitoring server 108. The example receipt image capturing device 116 is further described in conjunction with FIG. 3.

While the example of FIG. 1 communicatively couples components within a scanning environment 105 via a network 106, any one or more networks of one or more types may be utilized. For example, the network 106 may be implemented by any combination of local area networks, wide area networks, wired networks, wireless networks, etc.

Figure 2:
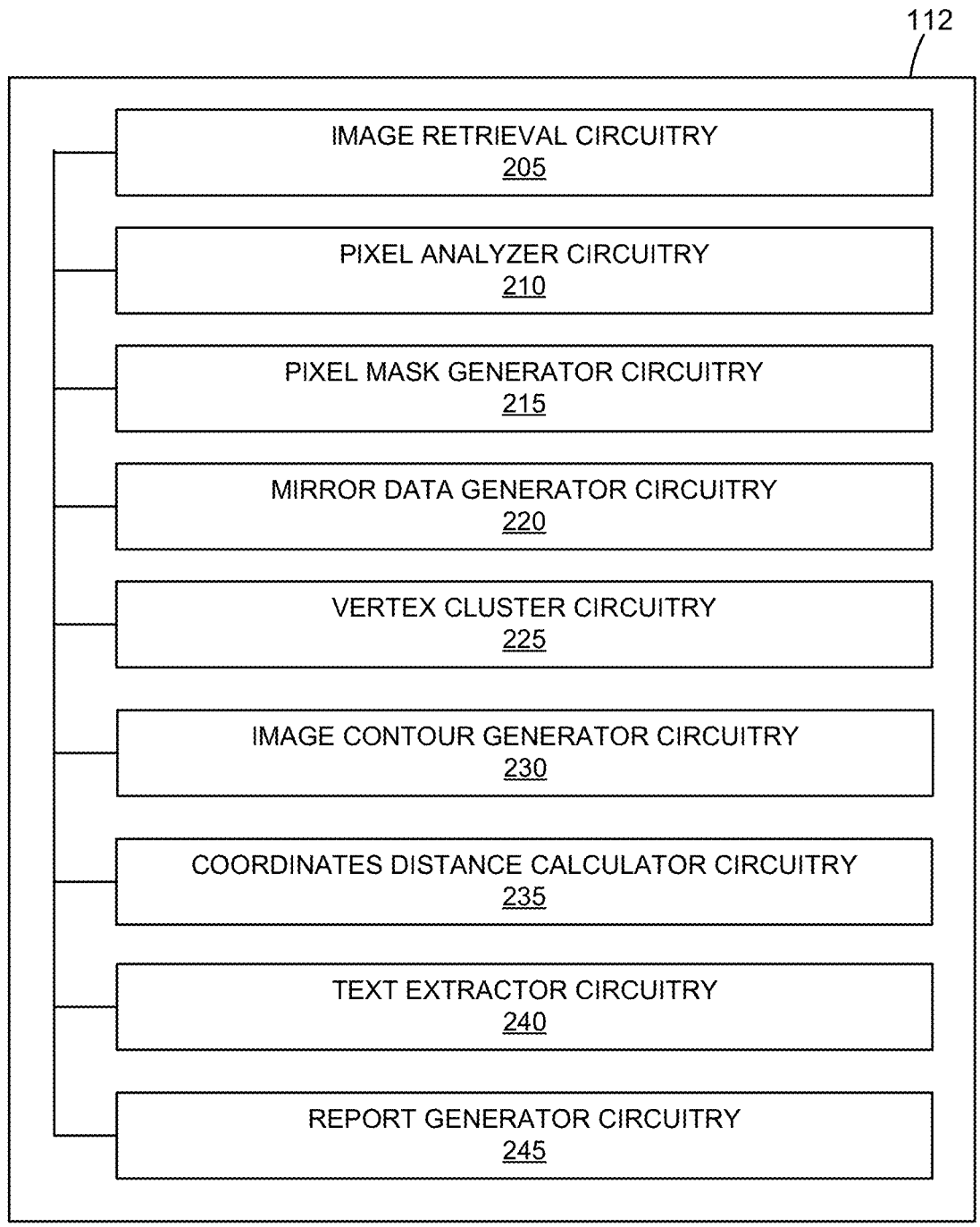
FIG. 2 is a block diagram of an example implementation of the receipt extractor circuitry of FIG. 1.

FIG. 2 is a block diagram of example receipt extracting circuitry 112 to extract text within a selection region of interest of a receipt image. The receipt extracting circuitry 112 of FIG. 2 may be instantiated (e.g., creating an instance of, bring into being for any length of time, materialize, implement, etc.) by processor circuitry such as a central processing unit executing instructions. Additionally or alternatively, the receipt extracting circuitry 112 of FIG. 2 may be instantiated (e.g., creating an instance of, bring into being for any length of time, materialize, implement, etc.) by an ASIC or an FPGA structured to perform operations corresponding to the instructions. It should be understood that some or all of the unique combination of circuitry of FIG. 2 may, thus, be instantiated at the same or different times. Some or all of the unique combination of circuitry may be instantiated, for example, in one or more threads executing concurrently on hardware and/or in series on hardware. Moreover, in some examples, some or all of the unique combination of circuitry of FIG. 2 may be implemented by microprocessor circuitry executing instructions to implement one or more virtual machines and/or containers.

The example receipt extractor circuitry 112 is structured to operate within the example monitoring server 108 of FIG. 1 and to receive input from any number of the user devices (e.g., the first user device 104A, the second user device 104B, and/or the third user device 104C) via a network 106 and perform region of interest text extraction.

In the illustrated example of FIG. 2, the receipt extractor circuitry 112 includes a unique combination of circuitry to accomplish examples disclosed herein. In particular, the receipt extractor circuitry 112 includes example image retrieval circuitry 205, example pixel analyzer circuitry 210, example pixel mask generator circuitry 215, example mirror data generator circuitry 220, example vertex cluster circuitry 225, example image contour generator circuitry 230, example coordinates distance calculator circuitry 235, example text extractor circuitry 240, and example report generator circuitry 245. In some examples, the receipt extractor circuitry 112 is instantiated by processor circuitry executing receipt extractor circuitry 112 instructions and/or configured to perform operations such as those represented by the flowcharts of FIGS. 4-8.

In operation, the example image retrieval circuitry 205 communicates with the receipt database 110 of FIG. 1 and/or directly with at least one of the user devices (e.g., the first user device 104A, the second user device 104B, and/or the third user device 104C) and/or the receipt image capturing device 116 through the network 106 to fetch and/or otherwise obtain a receipt input image for ROI text extraction. In some examples, the image retrieval circuitry 205 may be structured to pull data from the Internet or other sources not on the network 106. In some examples, the image retrieval circuitry 205 is instantiated by processor circuitry executing image retrieval circuitry 205 instructions and/or configured to perform operations such as those represented by the flowcharts of FIGS. 4-8.

In some examples, the example image retrieval circuitry 205 includes means for retrieving a receipt input image for region of interest text extraction from a receipt database and/or a receipt image capturing device. For example, the means for retrieving a receipt input image for region of interest text extraction from a receipt database and/or a receipt image capturing device may be implemented by image retrieval circuitry 205. In some examples, the image retrieval circuitry 205 may be instantiated by processor circuitry such as the example processor circuitry 1104 of FIG. 11. For instance, the image retrieval circuitry 205 may be instantiated by the example microprocessor 1200 of FIG. 12 executing machine executable instructions such as those implemented by at least block 402 of FIG. 4. In some examples, the image retrieval circuitry 205 may be instantiated by hardware logic circuitry, which may be implemented by an ASIC, XPU, or the FPGA circuitry 1300 of FIG. 13 structured to perform operations corresponding to the machine readable instructions. Additionally or alternatively, the image retrieval circuitry 205 may be instantiated by any other combination of hardware, software, and/or firmware. For example, the image retrieval circuitry 205 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example pixel analyzer circuitry 210 processes the input image retrieved from the receipt database 110 of FIG. 1 to convert RGB (red, green, blue) pixels to HSV (hue, saturation, value) pixels by looping through the input image data matrix, determining the maximum and minimum RGB pixel values in the matrix, and assigning hue, saturation, and value data based on the difference between the maximum and minimum RGB pixel values of the input receipt image. In examples disclosed herein, text in regions of interest for the input receipt images is often characterized by including larger, more emphasized text (e.g., increased font, bolded font, etc.), and/or more dense areas of text. Additionally, in examples disclosed herein, the input receipt images are also often characterized by being black and white (e.g., white receipt background, black text), meaning text in regions of interest and text in other regions are indistinguishable by color. Therefore, unlike conventional techniques, examples disclosed herein employ the conversion of RGB pixels to HSV to facilitate a greater accuracy in identification of text in regions of interest due to the ability to characterize pixels by HSV (hue, saturation, value) in instances wherein text of interest is not codified by color. Accordingly, because examples disclosed herein transform data into a format that improves pixel characterization detection, subsequent processing of such data may occur in a more efficient manner. As such, examples disclosed herein improve the technical field of market research with unique structure and processes that enables improved efficiency when identifying regions of interest. In some examples, the pixel analyzer circuitry 210 is instantiated by processor circuitry executing pixel analyzer circuitry 210 instructions and/or configured to perform operations such as those represented by the flowcharts of FIGS. 4-8.

In some examples, the pixel analyzer circuitry 210 includes means for reading in an input receipt image as RGB pixels, converting the RGB pixels to HSV pixels, and/or segmenting the image saturation data with a K-Means data clustering algorithm. For example, the means for reading in an input receipt image as RGB pixels, converting the RGB pixels to HSV pixels, and/or segmenting the image saturation data with a K-Means data clustering algorithm may be implemented by pixel analyzer circuitry 210. In some examples, the pixel analyzer circuitry 210 may be instantiated by processor circuitry such as the example processor circuitry 1112 of FIG. 11. For instance, the pixel analyzer circuitry 210 may be instantiated by the example microprocessor 1200 of FIG. 12 executing machine executable instructions such as those implemented by at least blocks 502, 504, and/or 506 of FIG. 5. In some examples, the pixel analyzer circuitry 210' may be instantiated by hardware logic circuitry, which may be implemented by an ASIC, XPU, or the FPGA circuitry 1300 of FIG. 13 structured to perform operations corresponding to the machine readable instructions. Additionally or alternatively, the pixel analyzer circuitry 210 may be instantiated by any other combination of hardware, software, and/or firmware. For example, the pixel analyzer circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example pixel mask generator circuitry 215 runs a clustering algorithm (e.g., K-Means data clustering algorithm with three clusters (K=3)) on the converted HSV pixel image data to segment the image into regions based on saturation values. In examples disclosed herein, the example pixel mask generator circuitry 215 performs the clustering algorithm using three clusters in order to cluster the pixels by hue, saturation, and value (HSV). The clustering of HSV pixels allows for distinction of text to determine regions of interest.

The example pixel mask generator circuitry 215 then extracts binary values from the clustered saturation data to populate a bit plane matrix of receipt image data. In examples disclosed herein, the bit plane matrix of receipt image data represents a representative binary value based on the clustered saturation data of the HSV pixels. In these examples, the representative binary value of the clustered saturation data is derived through extraction of a given bit of a binary encoding of each of the HSV pixels. For example, a saturation value of 105 would have a corresponding binary encoding of 1101001. From this binary encoding of 1101001, a singular bit is extracted by the pixel mask generator circuitry 215 to represent the saturation of the corresponding pixel, for use in the bit plane matrix of receipt image data. In examples disclosed herein, the $3^{rd}$ and/or $6^{th}$ bit of this binary encoding of saturation data for each pixel is used, however, any other combination of bits may be extracted for use in the bit plane matrix. In examples disclosed herein, any combination of the $3^{rd}$ and/or $6^{th}$ bits are used because smaller bits (e.g., $1^{st}$, $2^{nd}$ and/or $3^{rd}$ bits) tend to better represent dark saturation and higher bits (e.g., $5^{th}$, $6^{th}$, and/or $7^{th}$ bits) tend to better represent bright saturation. Therefore, any combination of smaller and higher bits for use in generation of the bit plane matrix by the pixel mask generator circuitry 215 creates a representative model of saturation data from which candidate regions of interest may be discerned.

Additionally, in examples disclosed herein, a vertex refers to a coordinate within an image pixel matrix (e.g., a bit plane matrix), indicating a location of a particular pixel. In some examples, regions of interest may be represented by adjacent pixels stored in the bit plane matrix all codified as having high saturation values. Additionally in some examples, the example pixel mask generator circuitry 215 is instantiated by processor circuitry executing pixel mask generator circuitry 215 instructions and/or configured to perform operations such as those represented by the flowcharts of FIGS. 4-8.

In some examples, the pixel mask generator circuitry 215 includes means for generating a bit plane matrix from the clustered saturation data. For example, the means for generating a bit plane matrix from the clustered saturation data may be implemented by pixel mask generator circuitry 215. In some examples, the pixel mask generator circuitry 215 may be instantiated by processor circuitry such as the example processor circuitry 1112 of FIG. 11. For instance, the pixel mask generator circuitry 215 may be instantiated by the example microprocessor 1200 of FIG. 12 executing machine executable instructions such as those implemented by at least blocks 508 and/or 510 of FIG. 5. In some examples, the pixel mask generator circuitry 215 may be instantiated by hardware logic circuitry, which may be implemented by an ASIC, XPU, or the FPGA circuitry 1300 of FIG. 13 structured to perform operations corresponding to the machine readable instructions. Additionally or alternatively, the pixel mask generator circuitry 215 may be instantiated by any other combination of hardware, software, and/or firmware. For example, the pixel mask generator circuitry 215 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example mirror data generator circuitry 220 iterates through each binary saturation value stored in the bit plane image data matrix, as generated by the example pixel mask generator circuitry 215, and inverts each stored binary saturation value to generate an inversely-saturated image of the inputted receipt (e.g., a stored binary saturation value of 0 is inverted to 1, and a stored binary saturation value of 1 is inverted to 0). In examples disclosed herein, the inversion of binary saturation values is performed to ensure better accuracy of text extraction (e.g., to create a stark contrast between text and background of the given receipt image). Using saturation data for region of interest identification and text extraction has proven to be more accurate than using RGB data, however, there is still some room for error in conversion. By inverting the saturation data, a higher accuracy of region of interesting identification and/or text extraction is achieved by generating a stark contrast to expose text that may otherwise blend into the background of the receipt (e.g., text that is light in color against a white receipt background). In some examples, the mirror data generator circuitry 220 is instantiated by processor circuitry executing mirror data generator circuitry 220 instructions and/or configured to perform operations such as those represented by the flowcharts of FIGS. 4-8.

In some examples, the mirror data generator circuitry 220 includes means for iterating through the bit plane matrix, determining the inverse saturation value for each image pixel, and/or storing that value in a new mirror data matrix. For example, the means for iterating through the bit plane matrix, determining the inverse saturation value for each image pixel, and/or storing that value in a new mirror data matrix may be implemented by mirror data generator circuitry 220. In some examples, the mirror data generator circuitry 220 may be instantiated by processor circuitry such as the example processor circuitry 1112 of FIG. 11. For instance, the mirror data generator circuitry 220 may be instantiated by the example microprocessor 1200 of FIG. 12 executing machine executable instructions such as those implemented by at least blocks 602, 604-, 606, and/or 608 of FIG. 6. In some examples, the mirror data generator circuitry 220 may be instantiated by hardware logic circuitry, which may be implemented by an ASIC, XPU, or the FPGA circuitry 1300 of FIG. 13 structured to perform operations corresponding to the machine readable instructions. Additionally or alternatively, the mirror data generator circuitry 220 may be instantiated by any other combination of hardware, software, and/or firmware. For example, the mirror data generator circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example vertex cluster circuitry 225 calculates the sum of binary values across all rows and columns in the bit plane data matrix, stores the vertex index values for all vertices in a region of interest, applies a K-Means clustering algorithm with one cluster (K=1) on the vertex indices, and calculates the vertex cluster center coordinates. In examples disclosed herein, the binary values across all rows and columns in the bit plane matrix are summed as a vertex index, which represents particular positions of the image (e.g., corresponding to rows/columns of the image pixels) that may be regions of interest. For example, a row and/or column with a series of vertex indices that are greater in value than their adjacent vertex indices may indicate a region of interest, as opposed to those with a series of vertex indices that are lesser in value than their adjacent vertex indices. In some examples, a threshold value may be used to determine whether a row and/or column may be part of a region of interest (e.g., if the associated vertex index satisfies the threshold value).

In examples disclosed herein, a given pixel encoded as a "0" in the corresponding position in the bit plane matrix indicates a dark saturation at that location in the input receipt image, and a given pixel encoded as a "1" in the corresponding position in the bit plane matrix indicates a bright saturation at that location in the input receipt image. Therefore, when the vertex cluster circuitry 225 calculates the sum of these binary values across all rows and/or columns of the bit plane matrix, the greater the value, the brighter the saturation of the given region. Therefore, in examples disclosed herein, candidate regions of interest may be determined to be areas of the bit plane matrix that have large aggregate binary values (e.g., areas having a sum of binary values that satisfies a threshold value). Identification of candidate regions of interest, as performed by the example vertex cluster circuitry 225, is further described in conjunction with FIG. 9B.

Additionally, in examples disclosed herein, the vertex cluster circuitry 225 calculates the vertex cluster center coordinates corresponding to the bit plane matrix data once the K-Means clustering of the vertex indices within the identified candidate regions of interest is complete (e.g., as indicated by the returning of clustering data by the OpenCV library, etc.). In examples disclosed herein, vertex cluster center coordinates represent center coordinates of each of the identified candidate regions of the interest. For example, a vertex cluster center coordinate of (2, 3) identified by the vertex cluster circuitry 225 would indicate that position as the center of one of the identified candidate regions of interest in the input receipt image (e.g., where "2" and "3" represent image pixel locations in the bit plane matrix). The vertex clusters are represented as clustered indices, and the center coordinates are calculated by gathering the center point of these clusters (e.g., using Euclidean distances, centroid calculating techniques, etc.). In some examples, the example vertex cluster circuitry 225 is instantiated by processor circuitry executing vertex cluster circuitry 225 instructions and/or configured to perform operations such as those represented by the flowcharts of FIGS. 4-8.

In some examples, the vertex cluster circuitry 225 includes means for calculating the sum of binary values across all rows and columns in the mirror data matrix, storing the vertex index value of vertices in a region of interest, segmenting the stored image vertex data using a K-Means clustering algorithm (K=1), and/or calculating the vertex cluster center coordinates. For example, the means for calculating the sum of binary values across all rows and columns in the mirror data matrix, storing the vertex index value of vertices in a region of interest, segmenting the stored image vertex data using a K-Means clustering algorithm (K=1), and/or calculating the vertex cluster center coordinates may be implemented by vertex cluster circuitry 225. In some examples, the vertex cluster circuitry 225 may be instantiated by processor circuitry such as the example processor circuitry 1112 of FIG. 11. For instance, the vertex cluster circuitry 225 may be instantiated by the example microprocessor 1200 of FIG. 12 executing machine executable instructions such as those implemented by at least blocks 702, 704, 706, 708, 710, 712, and/or 714 of FIG. 7. In some examples, the vertex cluster circuitry 225 may be instantiated by hardware logic circuitry, which may be implemented by an ASIC, XPU, or the FPGA circuitry 1300 of FIG. 13 structured to perform operations corresponding to the machine readable instructions. Additionally or alternatively, the vertex cluster circuitry 225 may be instantiated by any other combination of hardware, software, and/or firmware. For example, the vertex cluster circuitry 225 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example image contour generator circuitry 230 identifies the contour regions of the receipt image data to generate a grouping of continuous points in the image data that have the same or similar saturation values, using the mirror data matrix. In examples disclosed herein, similar to the process performed by the vertex cluster circuitry 225 (e.g., using the bit plane matrix data), the image contour generator circuitry 230 further identifies portions of the input receipt that are of interest (e.g., regions of densely-populated high saturation values, etc.) by clustering the mirror data matrix values. In examples disclosed herein, the image contour generator circuitry 230 generates these contour regions (i.e., regions of interest) by grouping together clustered matrix values by a process similar to that of the example vertex cluster circuitry 225. In some examples, the example image contour generator circuitry 230 is instantiated by processor circuitry executing image contour generator circuitry 230 instructions and/or configured to perform operations such as those represented by the flowcharts of FIGS. 4-8.

In some examples, the image contour generator circuitry 230 includes means for computing all image contour regions from the bit plane image data matrix. For example, the means for computing all image contour regions from the bit plane image data matrix may be implemented by image contour generator circuitry 230. In some examples, the image contour generator circuitry 230 may be instantiated by processor circuitry such as the example processor circuitry 1112 of FIG. 11. For instance, the image contour generator circuitry 230 may be instantiated by the example microprocessor 1200 of FIG. 12 executing machine executable instructions such as those implemented by at least block 802 of FIG. 8. In some examples, the image contour generator circuitry 230 may be instantiated by hardware logic circuitry, which may be implemented by an ASIC, XPU, or the FPGA circuitry 1300 of FIG. 13 structured to perform operations corresponding to the machine readable instructions. Additionally or alternatively, the image contour generator circuitry 230 may be instantiated by any other combination of hardware, software, and/or firmware. For example, the image contour generator circuitry 230 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example coordinates distance calculator 235 computes the center coordinates for each identified contour region of the receipt image in a process similar to that of the vertex cluster circuitry 225 for calculation of the vertex cluster center coordinates (e.g., using Euclidean distances, centroid calculating techniques, etc.).

The example coordinates distance calculator 235 then computes the difference between the contour region center coordinates and vertex cluster center coordinates. In examples disclosed herein, by calculating the difference between each of the contour region center coordinates and their corresponding vertex cluster center coordinates, an accuracy metric (e.g., indicated by the difference) is determined between the mirror data matrix values and the bit plane matrix data. In examples disclosed herein, the contour region center coordinates represent center coordinates of candidate regions of interest derived using the mirror data matrix values. In these examples, the vertex cluster center coordinates represent identified center coordinates of candidate regions of interest derived using the bit plane matrix data. Therefore, because both the bit plane matrix data and the mirror data matrix values represent the same receipt image in inverse forms, comparison of location of the identified center coordinates across both sets of identified candidate regions of interest provide information regarding accuracy of identification. For example, a smaller calculated difference between the contour region center coordinates and the vertex cluster center coordinates indicates a higher accuracy of identification (e.g., the corresponding region of interests across both the bit plane matrix data and the mirror data matrix values was identified within close proximity to each other). Similarly, a larger calculated difference between the contour region center coordinates and the vertex cluster center coordinates indicates a lower accuracy of identification.

In some examples, the coordinates distance calculator circuitry 235 is instantiated by processor circuitry executing coordinates distance calculator circuitry 235 instructions and/or configured to perform operations such as those represented by the flowcharts of FIGS. 4-8.

In some examples, the coordinates distance calculator circuitry 235 includes means for computing the center coordinates for each generated image contour region and/or calculating the distances between the contour region center coordinates and the vertex cluster center coordinates. For example, the means for computing the center coordinates for each generated image contour region and/or calculating the distances between the contour region center coordinates and the vertex cluster center coordinates may be implemented by coordinates distance calculator circuitry 235. In some examples, the coordinates distance calculator circuitry 235 may be instantiated by processor circuitry such as the example processor circuitry 1112 of FIG. 11. For instance, the coordinates distance calculator circuitry 235 may be instantiated by the example microprocessor 1200 of FIG. 12 executing machine executable instructions such as those implemented by at least blocks 804 and/or 806 of FIG. 8. In some examples, the coordinates distance calculator circuitry 235 may be instantiated by hardware logic circuitry, which may be implemented by an ASIC, XPU, or the FPGA circuitry 1300 of FIG. 13 structured to perform operations corresponding to the machine readable instructions. Additionally or alternatively, the coordinates distance calculator circuitry 235 may be instantiated by any other combination of hardware, software, and/or firmware. For example, the coordinates distance calculator circuitry 235 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example text extractor circuitry 240 sorts the calculated coordinates distances (e.g., in ascending order, in descending order, etc.) and retains the sorting index. Using this sorting index, the example text extractor circuitry 240 extracts the corresponding contour region from the bit plane matrix containing receipt input image data. In examples disclosed herein, the text extractor circuitry 240 may sort the coordinates distances calculated by the coordinates distance calculator circuitry 235 in ascending order and select the identified image contour region associated with the smallest difference as the final region of interest for text extraction. In examples disclosed herein, the vertex cluster center coordinates represent center points of identified potential regions of interest using the bit plane matrix data, and the contour region center coordinates represent center points of identified potential regions of interest using the mirror data matrix values. By computing the difference between these potential regions of interest, calculated using inverted data of the same image, the example text extractor circuitry 240 can select the final region of interest to be that which has the smallest sorted difference between the corresponding contour region center coordinate and vertex cluster center coordinate (e.g., as represented by the sorting index). As described above, in examples disclosed herein, the smaller the difference between the two values, the higher the accuracy of identification of the region of interest. For example, a small distance would indicate the potential region of interest represented by the vertex cluster center coordinate was identified to be in close proximity to the corresponding region of interest represented by the contour region center coordinate, showing accuracy in identification of these regions of interest. By using the mirror data matrix and bit plane matrix independently to compute potential regions of interest and comparing the results to select the final region of interest, the accuracy of identification of the final region of interest is greatly increased. As such, examples disclosed herein improve the technical field of market research by, at least, improving the ability of technology used to identify regions of interest in a more accurate and efficient manner.

In some examples, any number of criteria may be used to select the final region of interest using the identified potential regions of interest (e.g., using the vertex cluster center coordinates and/or contour region center coordinates), however, in examples disclosed herein, the region of interest that generates the minimum sorted difference between the two corresponding values is identified to be the final region of interest from which text is extracted.

In examples disclosed herein, once the final region of interest has been identified, the example text extractor circuitry 240 extracts the text located within this area. In some examples, extraction of text may include output of a portion of the image represented in the identified region of interest, output of the pixel data shown in the bit plane matrix, and/or any other representation of the data located within the indicated final region of interest (e.g., for use in further analysis, OCR, etc.). In some examples, the example text extractor circuitry 240 is instantiated by processor circuitry executing text extractor circuitry 240 instructions and/or configured to perform operations such as those represented by the flowcharts of FIGS. 4-8.

In some examples, the text extractor circuitry 240 includes means for sorting the calculated coordinates distances, retaining the sorting index, and/or extracting the contour region of interest from the bit plane image data matrix. For example, the means for sorting the calculated coordinates distances, retaining the sorting index, and/or extracting the contour region of interest from the bit plane image data matrix may be implemented by text extractor circuitry 240. In some examples, the text extractor circuitry 240 may be instantiated by processor circuitry such as the example processor circuitry 1112 of FIG. 11. For instance, the text extractor circuitry 240 may be instantiated by the example microprocessor 1200 of FIG. 12 executing machine executable instructions such as those implemented by at least blocks 808, 810, and/or 812 of FIG. 8. In some examples, the text extractor circuitry 240 may be instantiated by hardware logic circuitry, which may be implemented by an ASIC, XPU, or the FPGA circuitry 1300 of FIG. 13 structured to perform operations corresponding to the machine readable instructions. Additionally or alternatively, the text extractor circuitry 240 may be instantiated by any other combination of hardware, software, and/or firmware. For example, the text extractor circuitry 240 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example report generator circuitry 245 outputs the extracted contour region (e.g., via a graphical user interface, a database for analysis, etc.) as the text extracted from a region of interest in the inputted receipt. In examples disclosed herein, the example report (e.g., report 114 of FIG. 1) generated by the report generator circuitry 245 may include the extracted text, analysis of the extracted text, and/or any other information related to the extracted text. Furthermore, in some examples, the report generator circuitry 245 may be implemented such that the outputted text region is displayed to the user via a graphical user interface, etc. In some examples, the report generator circuitry 245 is instantiated by processor circuitry executing report generator circuitry 245 instructions and/or configured to perform operations such as those represented by the flowcharts of FIGS. 4-8.

In some examples, the report generator circuitry 245 includes means for presenting (e.g., a user) with the text extracted from a final region of interest from an input image of a receipt. For example, the means for presenting (e.g., a user) with the text extracted from a final region of interest from an input image of a receipt may be implemented by report generator circuitry 245. In some examples, the report generator circuitry 245 may be instantiated by processor circuitry such as the example processor circuitry 1112 of FIG. 11. For instance, the report generator circuitry 245 may be instantiated by the example microprocessor 1200 of FIG. 12 executing machine executable instructions such as those implemented by at least block 412 of FIG. 4. In some examples, the report generator circuitry 245 may be instantiated by hardware logic circuitry, which may be implemented by an ASIC, XPU, or the FPGA circuitry 1300 of FIG. 13 structured to perform operations corresponding to the machine readable instructions. Additionally or alternatively, the report generator circuitry 245 may be instantiated by any other combination of hardware, software, and/or firmware. For example, the report generator circuitry 245 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the receipt extractor circuitry 112 of FIG. 1 is illustrated in FIG. 2, one or more of the elements, processes, and/or devices illustrated in FIG. 2 may be combined, divided, re-arranged, omitted, eliminated, and/or implemented in any other way. Further, the example image retrieval circuitry 205, the example pixel analyzer circuitry 210, the pixel mask generator circuitry 215, the example mirror data generator circuitry 220, the example vertex cluster circuitry 225, the example image contour generator circuitry 230, the example coordinates distance calculator circuitry 235, the example text extractor circuitry 240, the example report generator circuitry 245, and/or, more generally, the example receipt extractor circuitry 112 of FIG. 1, may be implemented by hardware alone or by hardware in combination with software and/or firmware. Thus, for example, any of the example image retrieval circuitry 205, the example pixel analyzer circuitry 210, the example pixel mask generator circuitry 215, the example mirror data generator circuitry 220, the example vertex cluster circuitry 225, the example image contour generator circuitry 230, the example coordinates distance calculator circuitry 235, the example text extractor circuitry 240, the example report generator circuitry 245, and/or, more generally, the example receipt extractor circuitry 112 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example receipt extractor circuitry 112 of FIG. 1 may include one or more elements, processes, and/or devices in addition to, or instead of, those illustrated in FIG. 2, and/or may include more than one of any or all of the illustrated elements, processes and devices.

Figure 3:
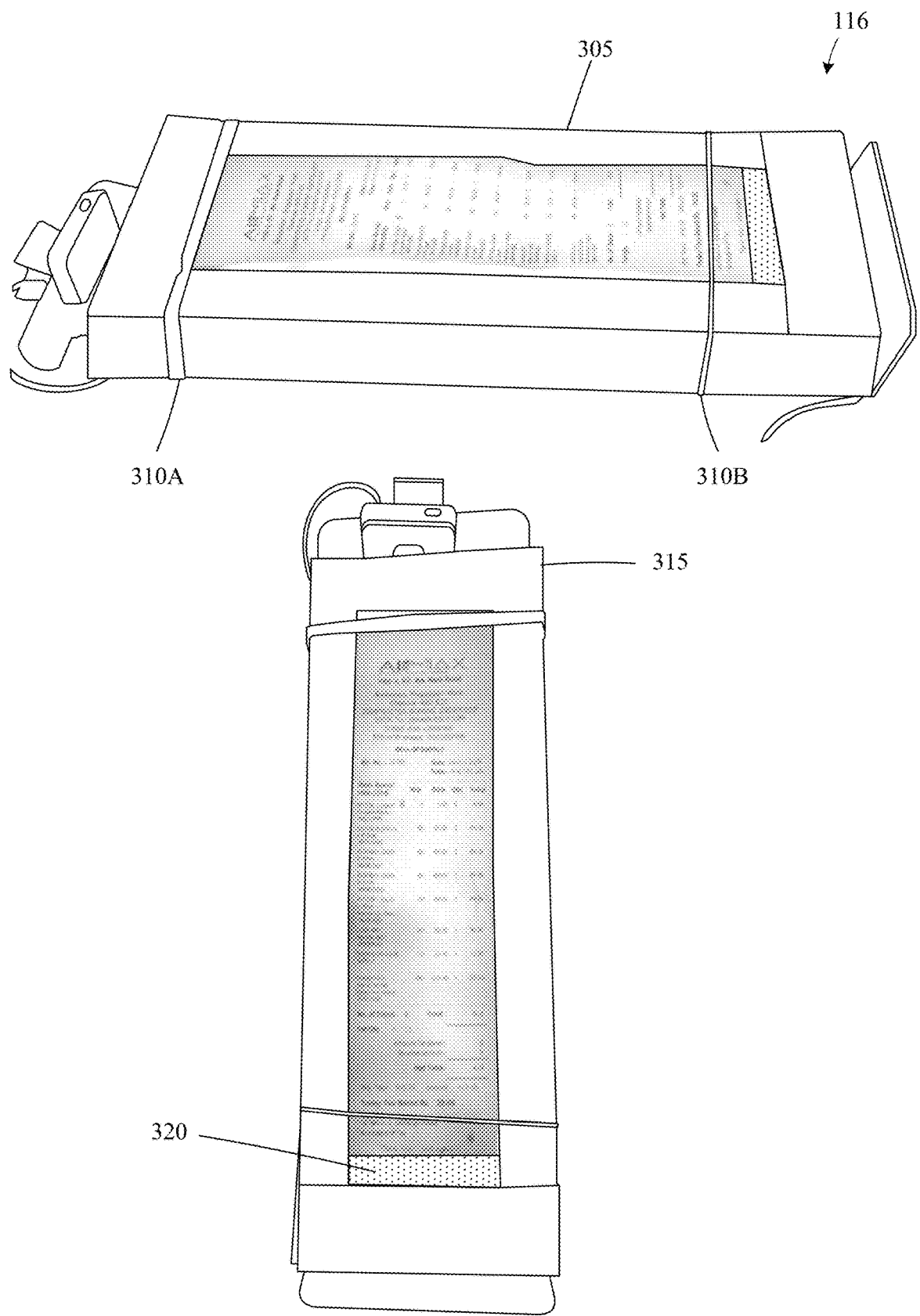
FIG. 3 depicts an example receipt image capturing device, to be used in conjunction with the receipt extractor circuitry of FIG. 1 in examples disclosed herein to perform region of interest text extraction.

FIG. 3 shows the example receipt image capturing device 116 of FIG. 1 wherein a user can place a receipt 305 on top of a housing 315 (e.g., an enclosure or a box structure to enclose image capturing hardware), using one or more lighting devices 320 (e.g., an LED light), and secured in place any number of fasteners 310A and/or 310B (e.g., two elastic bands). The housing 315 and the lighting devices 320 are used jointly to prevent glare, reflection, and/or any other sort of image-related noise that may interfere with the text extraction process. The example fasteners 310A and 310B are used to secure the receipt onto the housing 315 and/or to mark the top and bottom of the receipt.

Flowcharts representative of example machine readable instructions, which may be executed to configure processor circuitry to implement the receipt extractor circuitry 112 of FIGS. 1 and/or 2, are shown in FIGS. 4-8. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program(s) is/are described with reference to the flowcharts illustrated in FIGS. 4-8, many other methods of implementing the example receipt extractor circuitry 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 4:
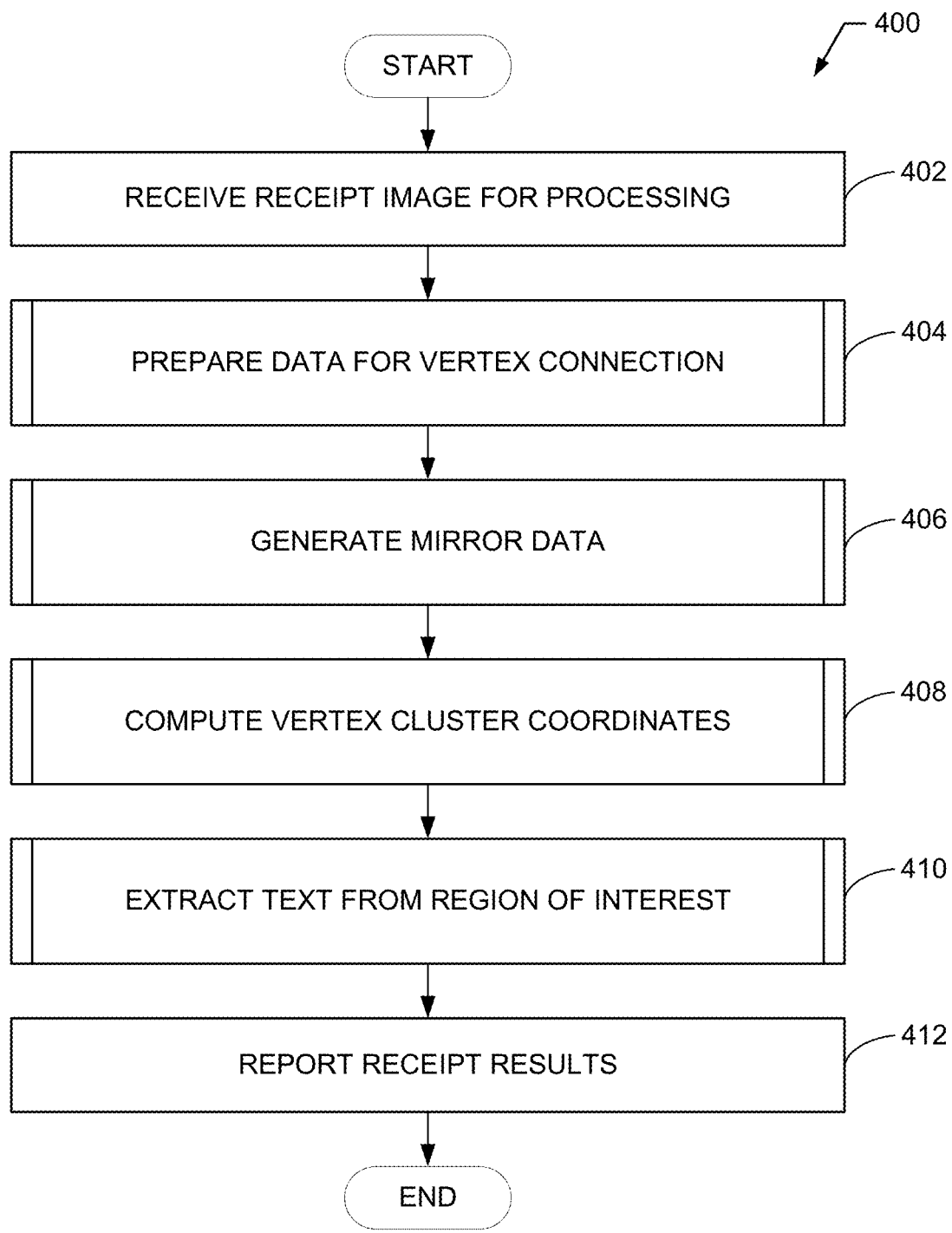
FIGS. 4-8 are flowcharts representative of machine readable instructions and/or example operations that may be executed by example processor circuitry to implement the receipt extractor circuitry of FIGS. 1 and/or 2.

FIG. 4 is a flowchart representative of example machine readable instructions 400 that may be executed by a processor to implement the example receipt extractor circuitry 112 of FIGS. 1 and/or 2 to perform region of interest text extraction on any document, such as a receipt. While examples disclosed herein substantially focus on receipts, such examples are used for illustrative purposes and are not limited thereto.

As illustrated in FIG. 4, at block 402, the receipt extractor circuitry 112 receives a receipt image input from the receipt database 110 of FIG. 1. In examples disclosed herein, any combination of the receipt image capturing device 116 (described in conjunction with FIG. 3) or at least one of the user devices 104A, 104B, and/or 104C of FIG. 1 may provide these input images through the network 106 for storage and retrieval in the receipt database 110.

At block 404, the receipt input image data is prepared for vertex connection by the pixel mask generator circuitry 215 of FIG. 2. An example process for preparing the input image data for vertex connection is described in conjunction with FIG. 5.

At block 406, the mirror data of the receipt input image is generated by the mirror data generator circuitry 220 of FIG. 2. In examples disclosed herein, "mirror data" refers to inversely-saturated image data, wherein a binary saturation pixel of 1 is changed to a 0 in the mirror data by the mirror data generator circuitry 220 of FIG. 2, and vice versa. An example process for generating mirror data is described in conjunction with FIG. 6.

At block 408, the vertex cluster coordinates are calculated. Vertex clusters represent each similarly saturated region in a bit plane image data matrix. In examples disclosed herein, an image vertex is considered to be in a region of interest if each of the element values in the bit plane image data matrix is equal to one and each element calculated in the row and column summation processes are greater than one. In these examples, a bit plane image data matrix value of one indicates an area of bright saturation. Therefore, any element that is greater than or equal to one may indicate a larger area of bright saturation, thus indicating a candidate region of interest. An example process for computing vertex cluster coordinates is described in conjunction with FIG. 7.

At block 410, text is extracted from the region of interest. The text areas within the input receipt image are represented as the different contour regions that are generated by the example image contour generator circuitry 230. The final selected contour region of interest and/or the text within the final selected contour region of interest is output as the result of the text extracting process by the example report generator circuitry 245. An example process for extracting the text from the region of interest is described in conjunction with FIG. 8.

At block 412, the receipt results are reported (e.g., to a database for further analysis and/or processing, via a graphical user interface, etc.) by the example report generator circuitry 245. In some examples, the receipt results are reported via a graphical user interface, and/or the results indicate the extracted text from the region of interest.

Figure 5:
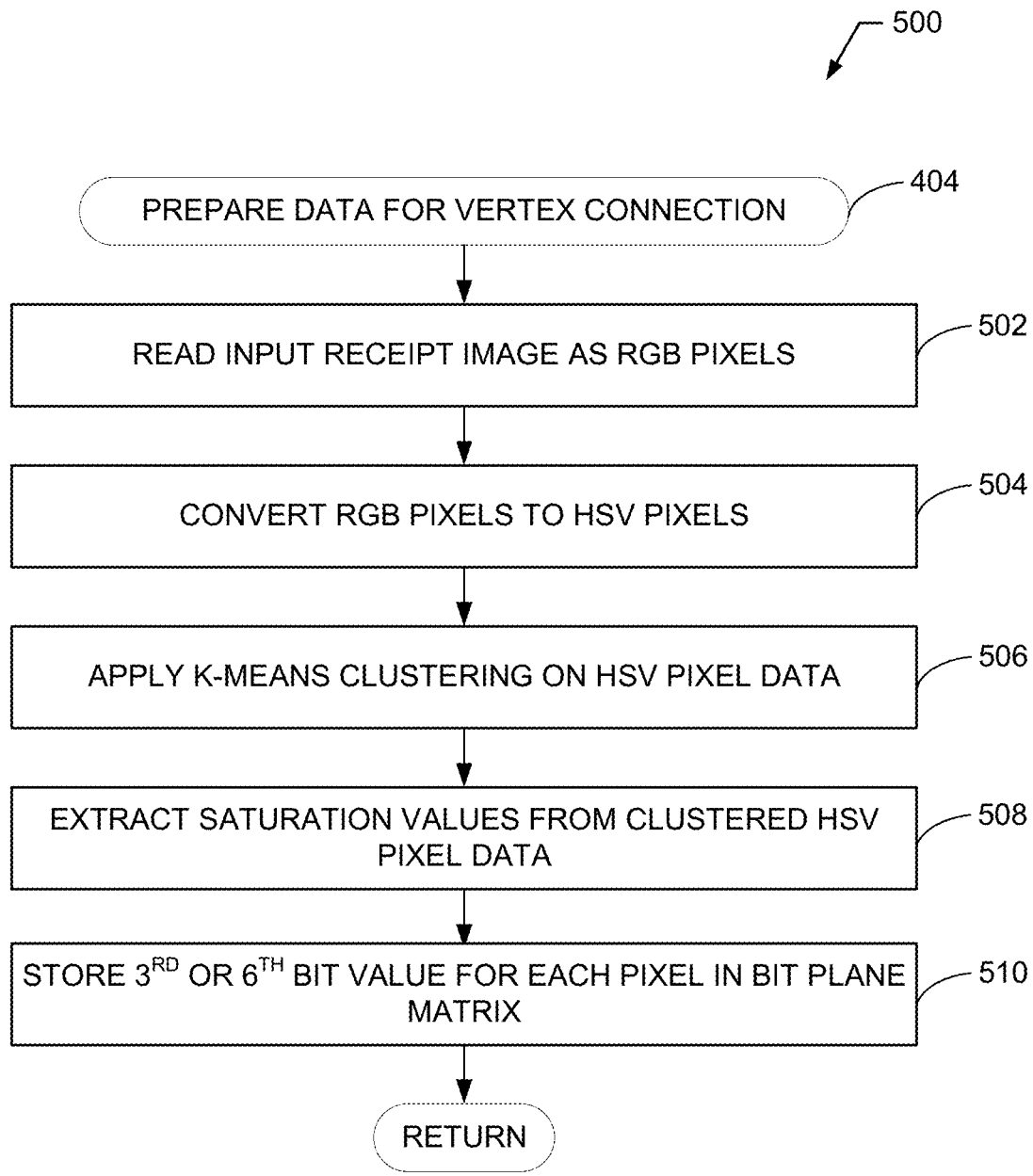

FIG. 5 is a flowchart representative of machine readable instructions which may be executed to implement block 404 of FIG. 4 to prepare the image data for vertex connection.

As illustrated in FIG. 5, at block 502, the input receipt image is read and stored in an image data matrix as RGB pixels by the pixel analyzer circuitry 210. In examples disclosed herein, RGB pixels represent the three color values of an image pixel: Red, Green, and Blue.

At block 504, the RGB pixel values from the input receipt image are converted to HSV pixels by the pixel analyzer circuitry 210 of FIG. 2. HSV pixels represent the Hue, Saturation, and Value of the image pixels. In examples disclosed herein, the RGB pixels are converted to HSV pixels by the pixel analyzer circuitry 210 by first dividing the Red, Green, and Blue values of each pixel by 255 to scale the values down to a range of 0 to 1. Then, the maximum and minimum values of the RGB pixel values are computed by the pixel analyzer circuitry 210, and the difference between the maximum and minimum is calculated by the pixel analyzer circuitry 210. For each pixel of the image data, when the maximum and minimum values are equal, the Hue is set to 0 for that pixel. If the maximum value and the R value (Red value of RGB pixel) are equal, the Hue value is assigned by the pixel analyzer circuitry 210 as $$60\left(\frac{(G-B)}{\mathit{diff}}+360\right)\%\,360,$$

in which G and B represent the Green and Blue values of the RGB pixel, respectively, and diff refers to the calculated difference between the maximum and minimum values. If the example pixel analyzer circuitry 210 determines that the maximum value and the G value (Green value of RGB pixel) are equal, then the example pixel analyzer circuitry 210 assigns the Hue value as $$60\left(\frac{(B-R)}{\mathit{diff}}+360\right)\%\,360,$$

in which B and R represent the Blue and Red values of the RGB pixel, respectively, and diff once again refers to the calculated difference between the maximum and minimum values. If the maximum value and the B value of the pixel (Blue value) are determined to be equal by the pixel analyzer circuitry 210, the Hue value is assigned as $$60\left(\frac{(R-G)}{\mathit{diff}}+360\right)\%\,360,$$

wherein R and G represent the Red and Green values of the RGB pixel, respectively, and diff refers to the calculated difference between the maximum and minimum values. Once the Hue values for each pixel are calculated, the Saturation values are assigned by the pixel analyzer circuitry 210. If the calculated maximum value is zero, the Saturation value is set to zero as well by the pixel analyzer circuitry 210. Otherwise, the Saturation value is assigned by the pixel analyzer circuitry 210 as $$\left(\frac{\mathit{diff}}{C_{max}}\right)*100,$$

wherein $C_{max}$ represents the maximum value calculated from the input image data, and diff refers to the calculated difference between the maximum and minimum values. The Value of each pixel is always assigned by the pixel analyzer circuitry 210 as $C_{max}*100$, wherein $C_{max}$ represents the maximum value calculated from the input image data.

At block 506, the input image data, now stored as HSV pixels, is segmented by the pixel mask generator circuitry 215 using a K-Means clustering algorithm. In examples closed herein, the HSV pixel image is segmented by the pixel mask generator circuitry 215 using three clusters (K=3). In examples disclosed herein, the example pixel mask generator circuitry 215 performs the clustering algorithm using three clusters in order to cluster the pixels by hue, saturation, and value (HSV). The clustering of HSV pixels allows for distinction of text to determine regions of interest.

At block 508, the saturation values are extracted by the mirror data generator circuitry 220 from the clustered HSV pixel image data. In examples disclosed herein, extraction of the saturation values refers to retrieval of the stored saturation data corresponding to each pixel of the image data. In examples disclosed herein, the saturation values represent an amount of white light associated with a hue of a pixel (e.g., an intensity and/or brightness of color). While examples disclosed herein utilize (e.g., extract) saturation values as a metric from which candidate regions of interest are selected, other approaches that utilize hue and/or value may be employed.

At block 510, the $3^{rd}$ and/or $6^{th}$ bit values are stored for each pixel in a bit plane image data matrix by the mirror data generator circuitry 220. In examples disclosed herein, the color and/or nature of each image pixel is represented by eight bits. Either the third or sixth bit from each input image pixel is chosen and stored for processing by the mirror data generator circuitry 220. In examples disclosed herein, the $3^{rd}$ and/or $6^{th}$ bit of this binary encoding of saturation data for each pixel is used, however, any other combination of bits may be extracted for use in the bit plane matrix. In examples disclosed herein, any combination of the $3^{rd}$ and/or $6^{th}$ bits are used because smaller bits (e.g., $1^{st}$, $2^{nd}$, and/or $3^{rd}$ bits) tend to better represent dark saturation and higher bits (e.g., $5^{th}$, $6^{th}$, and/or $7^{th}$ bits) tend to better represent bright saturation. Therefore, any combination of smaller and higher bits for use in generation of the bit plane matrix by the pixel mask generator circuitry 215 creates a representative model of saturation data from which candidate regions of interest may be discerned.

In some examples, a total number of bit values may differ. As such, the mirror data generator circuitry 220 acquires all bit values and, in some examples, identifies which ones of the bit values are relatively higher as compared to ones of the bit values that are relatively lower. For instances, the mirror data generator circuitry 220 ranks and/or otherwise identifies particular ones of the bit values that reside in the top 10% of all bit values, and ranks and/or otherwise identifies particular ones of the bit values that reside in the bottom 10% of all bit values. As such, selections of particular bit values that reside in respective extremes of the overall quantity of bit values can be identified and/or otherwise selected.

Figure 6:
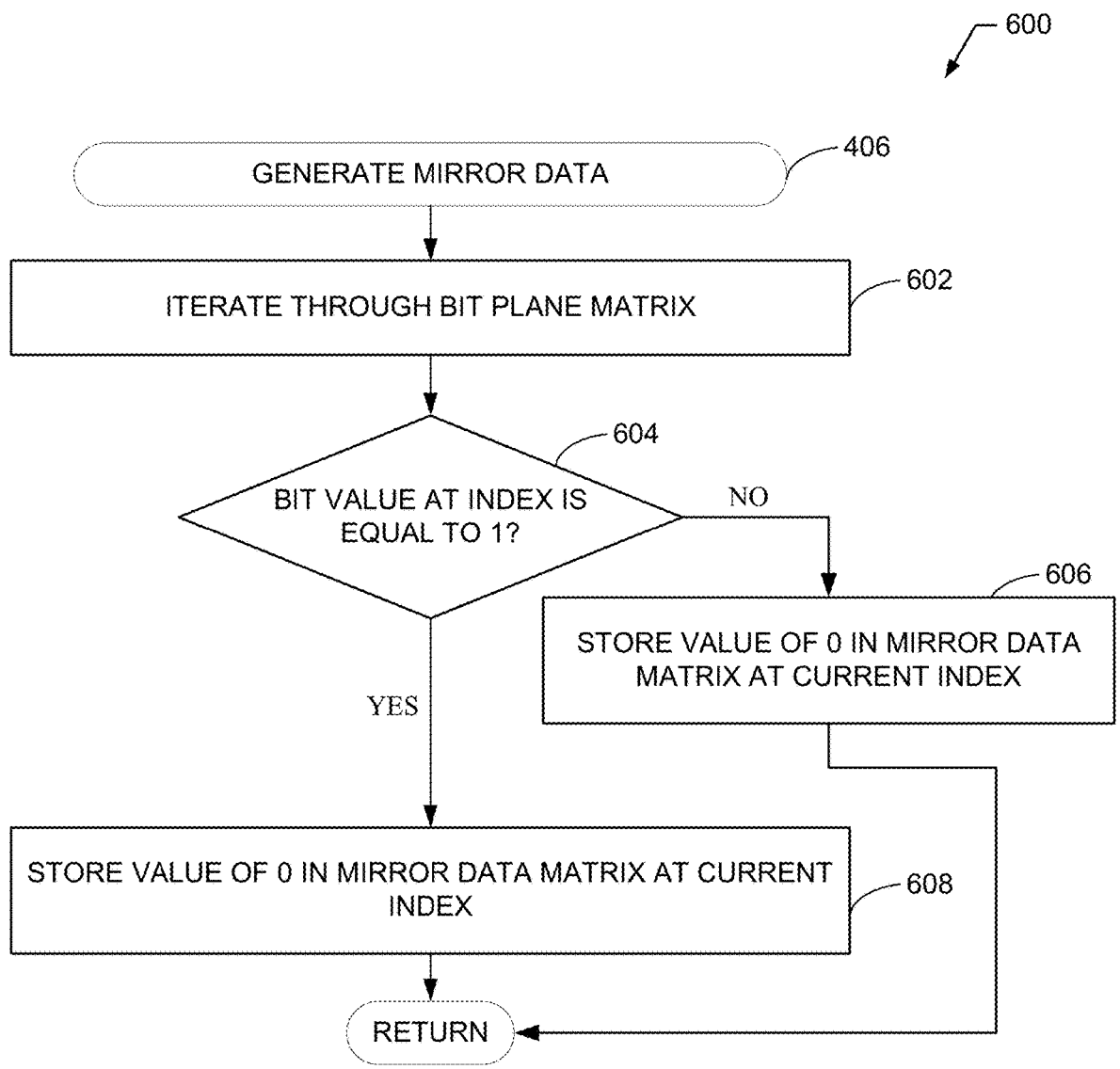

FIG. 6 is a flowchart representative of machine readable instructions which may be executed to implement block 406 of FIG. 4 to calculate the mirror image data from the bit plane image data matrix.

As illustrated in FIG. 6, at block 602, the bit plane image data matrix, representing each pixel of the input image data, is iterated through by the example mirror data generator circuitry 215.

At block 604, the mirror data generator circuitry 215 checks to see if the bit value at the current index is equal to one. In examples disclosed herein, the mirror data matrix is generated by inverting each of the binary saturation values stored in the bit plane matrix, therefore, by iterating through and inverting each of the values, the mirror data matrix is generated by the mirror data generator circuitry 215.

At block 606, if the bit value at the current index in the bit plane image data matrix is equal to one, a value of zero (e.g., the binary inverse of 1) is stored in the mirror data matrix at the current index.

At block 608, if the bit value at the current index in the bit plane image data matrix is not equal to one, a value of one (e.g., the binary inverse of 0) is stored in the mirror data matrix at the current index.

In examples disclosed herein, the inversion of binary saturation values is performed to ensure better accuracy of text extraction (e.g., to create a stark contrast between text and background of the given receipt image).

Figure 7:
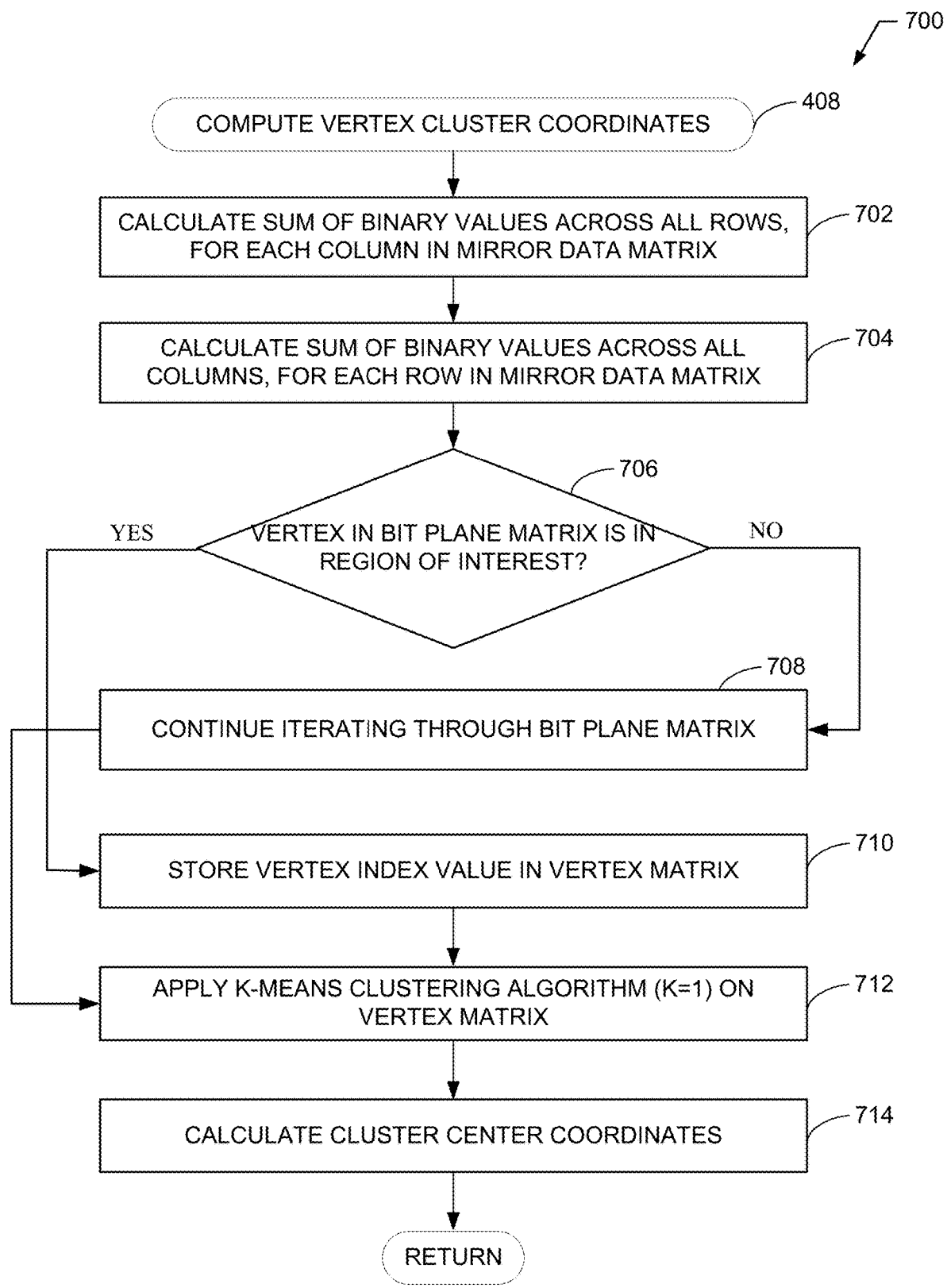

FIG. 7 is a flowchart representative of machine readable instructions which may be executed to implement block 408 of FIG. 4 to compute the vertex cluster coordinates.

As illustrated in FIG. 7, at block 702, the sum of binary values across all rows, for each column in the bit plane matrix is calculated and/or stored by the example vertex cluster circuitry 225. In examples disclosed herein, this is done by iterating across each column and keeping track of the sum of values across each row in the bit plane matrix by the vertex cluster circuitry 225. While discussed in further detail in the illustrated example of FIG. 9B, a sum of binary values across a first row "1" has a value of six, a sum of binary values across a second row "2" has a value of four, and a sum of binary values across a third row "3" has a value of three.

At block 704, the sum of binary values across all columns, for each row in the bit plane matrix is calculated and/or stored by the example vertex cluster circuitry 225. In examples disclosed herein, this is done by iterating across each row and keeping track of the sum of values across each column in the bit plane matrix by the vertex cluster circuitry 225. While discussed in further detail in the illustrated example of FIG. 9B, a sum of binary values corresponding to a first column "1" represents a value of two, a sum of binary values corresponding to a second column "2" represents a value of one, and so on.

At block 706, the vertex cluster circuitry 225 checks to see if each vertex value in the bit plane image data matrix is in a region of interest. In examples disclosed herein, the vertex cluster circuitry 225 determines if a vertex is in a region of interest if the binary value at the current index in the mirror image data matrix is equal to one and the row and column binary summation values at the current index are greater than one, as described in further detail in the illustrated example of FIG. 9B. That is, the vertex cluster circuitry 225 identifies candidate regions containing higher saturation values (e.g., with larger index values). In some examples, any number of threshold value(s) may be used to determine whether a given vertex (e.g., image pixel) is located within a candidate region of interest.

At block 708, if the vertex value at the current index is not determined to be in a region of interest (i.e., the binary value at the current index in the mirror image data matrix is not equal to one or the row and/or column binary summation values at the current index are less than or equal to one) by the vertex cluster circuitry 225, the vertex cluster circuitry 225 continues iterating through the bit plane image data matrix. That is, the given vertex (e.g., pixel) is determined to not be in a candidate region of interest.

At block 710, if the vertex value at the current index is determined to be in a region of interest (i.e., the binary value at the current index in the mirror image data matrix is not equal to one or the row and/or column binary summation values at the current index are less than or equal to one) by the vertex cluster circuitry 225, the current vertex index value is stored in a vertex matrix by the vertex cluster circuitry 225.

At block 712, the vertex matrix values are segmented by the vertex cluster circuitry 225 using a K-Means clustering algorithm. In examples disclosed herein, the vertex values are clustered by the vertex cluster circuitry 225 using one cluster (K=1). In examples disclosed herein, the vertex matrix values are further segmented by the vertex clustering circuitry 225 (e.g., using a K-Means clustering algorithm) in order to further identify each of the candidate regions of interest, for use in calculation of center coordinates.

At block 714, the center coordinates of the computed vertex cluster are calculated and/or stored by the coordinates distance calculator circuitry 235. In examples disclosed herein, the center coordinates may be calculated by the coordinates distance calculator circuitry 235 using Euclidean distances (e.g., distances between each of the vertices in a given candidate region of interest), and/or any other type of centroid calculating technique.

Figure 8:
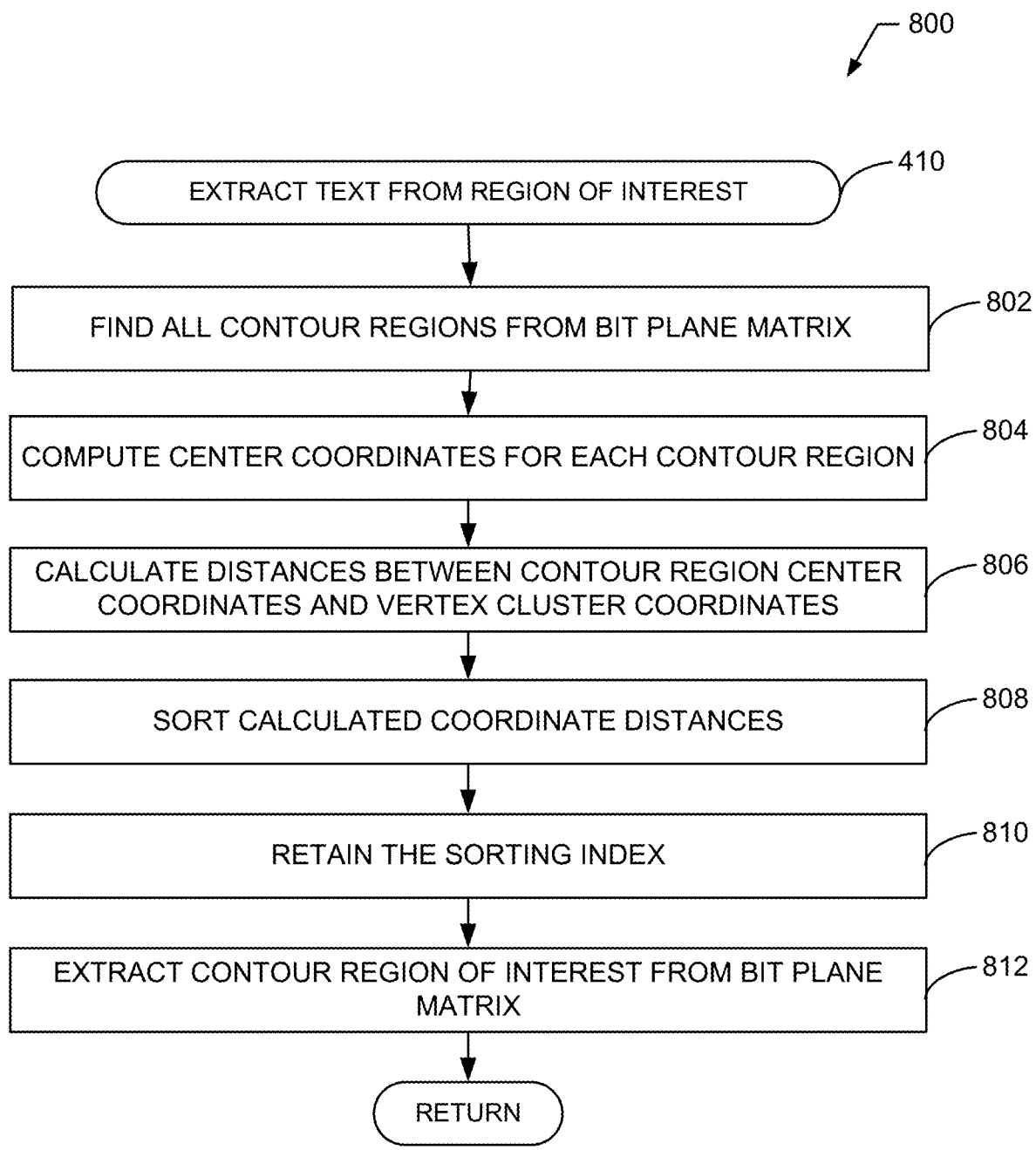

FIG. 8 is a flowchart representative of machine readable instructions which may be executed to implement block 410 of FIG. 4 to extract the text from the region of interest.

As illustrated in FIG. 8, at block 802, all candidate contour image regions (e.g., candidate regions of interest) are found from the bit plane image data matrix by the image contour generator circuitry 230. In examples disclosed herein, the candidate image contour regions represent a continuous set of points in an input image wherein the saturation values are either similar or the same. In examples disclosed herein, similar to the process performed by the vertex cluster circuitry 225 (e.g., using the bit plane matrix data), the image contour generator circuitry 230 further identifies portions of the input receipt that are of interest (e.g., regions of densely-populated high saturation values, etc.) by clustering the mirror data matrix values. In examples disclosed herein, the image contour generator circuitry 230 generates these contour regions (i.e., regions of interest) by grouping together clustered matrix values by a process (e.g., that of FIG. 7) similar to that of the example vertex cluster circuitry 225.

At block 804, the center coordinates are calculated by the coordinates distance calculator circuitry 235 for each of the generated contour regions from the bit plane image data matrix. In examples disclosed herein, the center coordinates may be calculated by the coordinates distance calculator circuitry 235 using Euclidean distances (e.g., distances between each of the vertices in a given candidate region of interest), and/or any other type of centroid calculating technique.

At block 806, the distances between each of the calculated contour region center coordinates and the previously-calculated vertex cluster center coordinates are calculated and/or stored by the coordinates distance calculator circuitry 235. In examples disclosed herein, by calculating the difference between each of the contour region center coordinates and their corresponding vertex cluster center coordinates, an accuracy metric (e.g., indicated by the difference) is determined between the mirror data matrix values and the bit plane matrix data. In examples disclosed herein, the contour region center coordinates represent center coordinates of candidate regions of interest derived using the mirror data matrix values. In these examples, the vertex cluster center coordinates represent identified center coordinates of candidate regions of interest derived using the bit plane matrix data. Therefore, since both the bit plane matrix data and the mirror data matrix values represent the same receipt image in inverse forms, comparison of location of the identified center coordinates across both sets of identified candidate regions of interest provide information regarding accuracy of identification. For example, a smaller calculated difference between the contour region center coordinates and the vertex cluster center coordinates indicates a higher accuracy of identification (e.g., the corresponding region of interests across both the bit plane matrix data and the mirror data matrix values was identified within close proximity to each other). Similarly, a larger calculated difference between the contour region center coordinates and the vertex cluster center coordinates indicates a lower accuracy of identification.

At block 808, the calculated coordinate distances are sorted by the coordinates distance calculator circuitry 235. In some examples, the calculated coordinate distances may be sorted (e.g., in ascending order, in descending order, etc.) by the coordinates distance calculator circuitry 235 using any number of sorting algorithms such as quicksort, binary search, breadth-first search, merge sort, insertion sort, etc.

At block 810, the sorting index from the coordinate distance sorting process of block 808 is retained by the coordinates distance calculator circuitry 235.

At block 812, the contour region represented by a selected sorting index is extracted from the bit plane image data matrix by the example text extractor circuitry 240. In examples disclosed herein, the text extractor circuitry 240 may sort the coordinates distances calculated by the coordinates distance calculator circuitry 235 in ascending order and select the identified image contour region associated with the smallest difference as the final region of interest for text extraction.

Figure 9A:
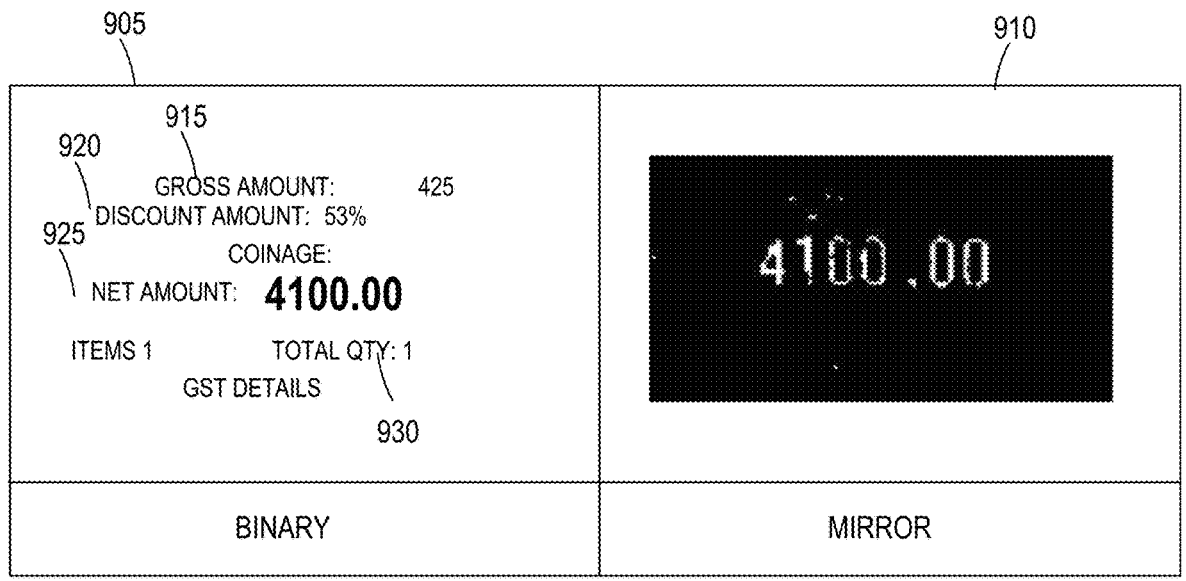
FIG. 9A illustrates the binary and mirror image representations of a region of interest within an input receipt image.

FIG. 9A depicts an example receipt image that has been processed and/or stored in a binary (or bit plane) matrix 905 and a mirror image data matrix 910. The binary image data matrix 905 shows some transactional data such as gross amount 915, discount amount 920, net amount 925, and number of items purchased 930. The mirror image data matrix 910 shows the inverse of the binary image data matrix 905. In the conversion process from white to black text (and vice versa) for the mirror image data matrix 910, the large text (e.g., representing the net amount) of the input receipt image becomes more prominent, and the smaller text in the background becomes less prominent. In the example illustrated in FIG. 9A the intended region of interest is that which includes the net amount of the receipt. In examples disclosed herein, conversion from bit plane matrix values to mirror matrix data values (e.g., by the example mirror data generator circuitry 220) has an illustrated loss of information in regions that are not in an intended candidate region of interest (e.g., text that has a low saturation, text that is not emphasized, bolded, of a larger font size, etc.).

Figure 9B:
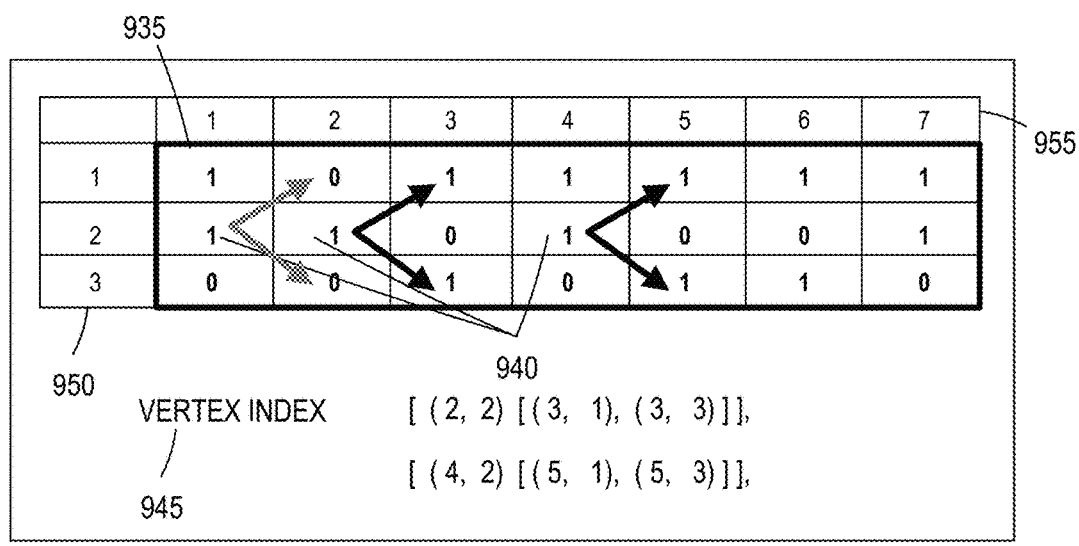
FIG. 9B depicts a vertex calculation technique for determining a region of interest, given an input receipt image.

In examples disclosed herein, the inversion of binary saturation values by the mirror data generator circuitry 220, as illustrated in FIG. 9B, is performed to ensure better accuracy of text extraction (e.g., to create a stark contrast between text and background of the given receipt image). By inverting the saturation data, a higher accuracy of region of interesting identification and/or text extraction is achieved by generating a stark contrast to expose text that may otherwise blend into the background of the receipt (e.g., text that is light in color against a white receipt background) and by further eliminating any distracting text.

FIG. 9B further illustrates the vertex selection process that was described in block 706 of FIG. 7. In examples disclosed herein, the vertex selection process, as performed by the example vertex cluster circuitry 225 and/or the example image contour generator circuitry 230 of FIG. 2, includes selection of rows of the mirror image data matrix and/or the binary image data matrix in groups, representing selections of portions of binary-represented image pixels from an input receipt image (e.g., the first receipt 102A, the second receipt 102B, and/or the third receipt 102C of FIG. 1). The selected portions of binary values are shown in an example matrix 935. In examples disclosed herein, the rows of pixels are grouped by three to allow for efficient identification of a center point (e.g., a center row), as it relates to adjacent vertices in the top and/or bottom rows of the selection. However, any number of rows may be grouped together by the vertex cluster circuitry 225 and/or the image contour generator circuitry 230 for use in selection of vertices.

For each value in the center row (e.g., the second row of the selected region) of the matrix 935, the vertex cluster circuitry 225 and/or the image contour generator circuitry 230 determine whether the binary value at the current coordinate position is equal to one. Upon determination that the binary value at the current coordinate position is equal to one, the vertex cluster circuitry 225 and/or the image contour generator circuitry 230 examine the binary values located diagonally-adjacent to the current binary value. In the event one or more of the binary values located diagonally-adjacent to the current binary value are equal to one, the vertex cluster circuitry 225 and/or the image contour generator circuitry 230 stores the coordinate location of the respective diagonally-adjacent binary value (e.g., vertex) for use in identification of candidate regions of interest.

The vertex selection process of FIG. 9B further includes a set of vertex indices 945, which includes all vertices (e.g., of the set of vertices 940) indicated to be within candidate regions of interest. For example, in the illustrated matrix 935 of FIG. 9B (e.g., the binary image data matrix and/or the mirror image data matrix), example selected center vertices 940 represent vertices in the second row (e.g., the center row) of the selected portion of binary-represented image pixels that were determined to have a value of one by the vertex cluster circuitry 225 and/or the image contour generator circuitry 230 of FIG. 2.

Example horizontal axis values 955 and example vertical axis values 950 are used to indicate positions of each of the set of vertices 940 for use in determination of the vertex indices 945 by the vertex cluster circuitry 225 and/or the image contour generator circuitry 230. For example, a vertex of the set of vertices 940 that has a corresponding value of the vertical axis values 950 of 2 and a value of the horizontal axis values 955 of 4 would be stored as (4, 2) in the example vertex indices 945 by the vertex cluster circuitry 225 and/or the image contour generator circuitry 230. In examples disclosed herein, each of the positions indicated by the vertical axis values 950 and the horizontal axis values 955 are indicative of pixels of the input receipt image. Each respective coordinate location of the selected center vertices 940 is stored as a part of the vertex indices 945 upon determination by the vertex cluster circuitry 225 and/or the image contour generator circuitry 230 that the respective diagonally-adjacent coordinates of the indicated vertex of the selected center vertices 940 are also equal to one.

In examples disclosed herein, the vertex selection process is used to indicate areas of potential (e.g., candidate) regions of interest, as each of the row and/or column vertex indices are indicative of a saturation level of the input image at that location (e.g., a binary representation of the saturation level). By determining, using the vertex cluster circuitry 225 and/or the image contour generator circuitry 230, whether diagonally-adjacent vertices have a similar saturation level (e.g., as indicated by the binary values) and storing the respective coordinate locations, candidate regions of interest are identified.

Figure 10:
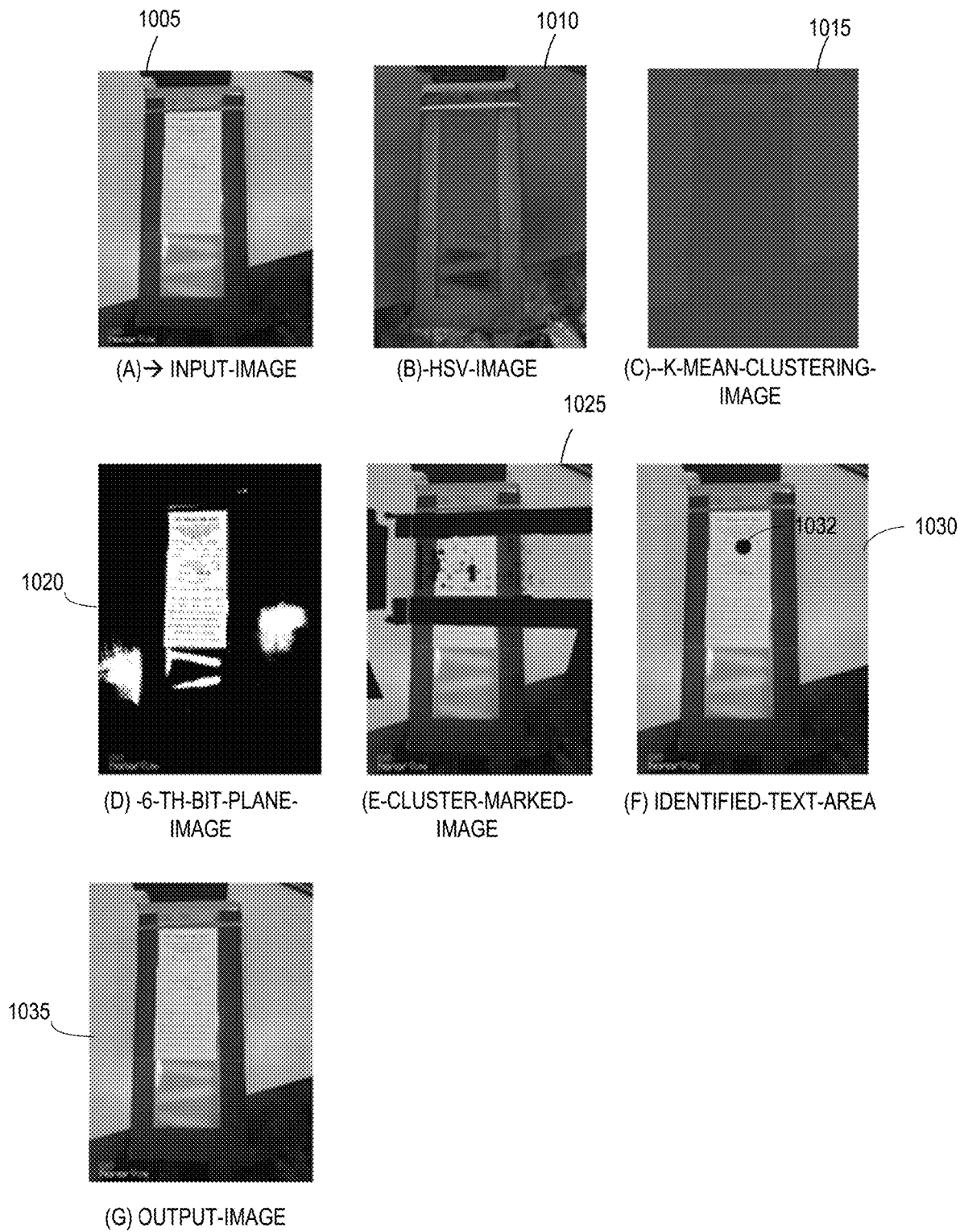
FIG. 10 is a representation of an input receipt image at different steps of the region of interest text extraction process.

FIG. 10 is a diagram depicting an example input receipt image at each step of the example processes of FIGS. 4-8, as implemented by the receipt extractor circuitry 112 of FIGS. 1 and/or 2.

An example input image 1005 shows a receipt laid on top of the example receipt image capturing device 116 of FIGS. 1 and/or 3. The input image 1005 is an example of an input receipt image that may be captured by any combination of the receipt image capturing device 116 and/or the first user device 104A, the second user device 104B, and/or the third user device 104C of FIG. 1. Further, the input image 1005, in examples disclosed herein, may be retrieved from the receipt database 110 of FIG. 1 by the example image retrieval circuitry 205 of FIGS. 1 and/or 2.

An example HSV image 1010 shows the input receipt image 1005 after the RGB pixels have been converted to HSV pixels by the example pixel analyzer circuitry 210 of FIG. 2. In the example HSV image 1010, a contrast is shown between text and background, showing an improvement in detection of text in an input image (e.g., input image 1005) with otherwise difficult to discern text.

An example K-Means clustered image 1015 shows the HSV pixel image data (e.g., the HSV image 1010) after an image segmentation process has been run by the example pixel mask generator circuitry 215 to generate three clusters (e.g., hue, saturation, and value clusters). In the example K-Means clustered image 1015, a clear indication of contrast is displayed between certain portions of text and the background of the receipt image.

An example 6$^{th}$ bit plane image 1020 shows the binary image data, after the 3$^{rd}$ and/or 6$^{th}$ bit for each pixel of the input receipt image has been extracted and stored by the pixel mask generator circuitry 215, in accordance with the teachings of this disclosure. As illustrated in FIG. 10, the 6$^{th}$ bit plane image 1020 shows a high contrast depiction of the input receipt image in black and white, showing the same contrasted portions of text from the K-Means clustered image 1015 in clearer detail.

An example cluster marked image 1025 depicts the vertex clustering and contour region generation of the binary image data matrix performed by the vertex cluster circuitry 225, in accordance with the teachings of this disclosure. The example cluster marked image 1025 shows identified candidate regions of interest, further indicating the same heavily contrasted portions of text from the HSV image 1010, the K-means clustered image 1015, and the 6$^{th}$ bit plane image 1020.

An example identified text area 1030 shows a highlighted final selected candidate region of interest 1032 that has been identified for use in text extraction by the coordinates distance calculator circuitry 235, in accordance with the teachings of this disclosure.

An example output image 1035 is similar (e.g., the same) to the input image 1005. In examples disclosed herein, after the text in the region of interest has been extracted by the text extractor circuitry 240 and the report (e.g., to a user, etc.) has been generated by the report generator circuitry 245, the same receipt input image (e.g., input image 1005) may be output.

Figure 11:
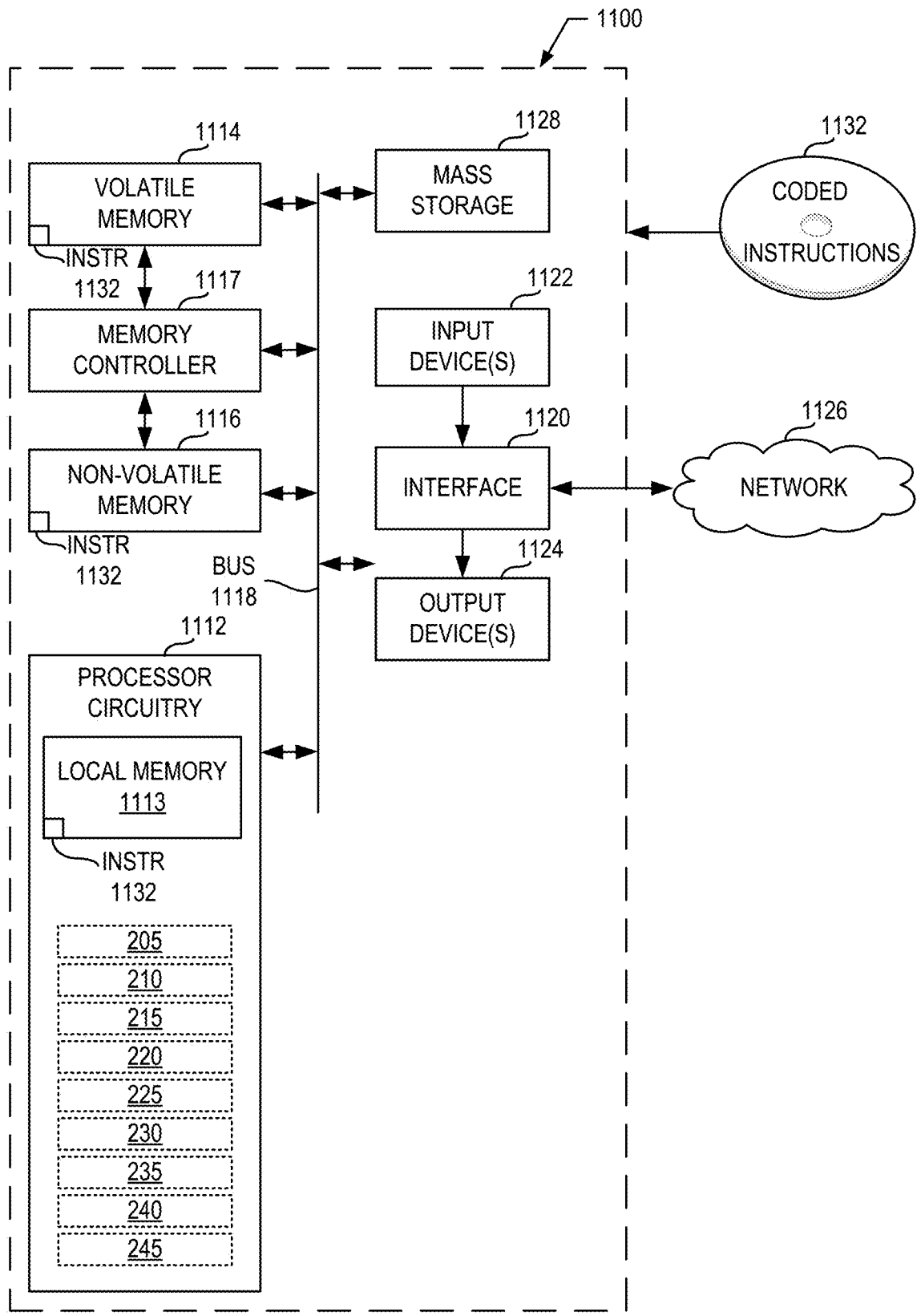
FIG. 11 is a block diagram of an example processing platform including processor circuitry structured to execute the example machine readable instructions and/or the example operations of FIGS. 4-8 to implement the receipt extractor circuitry of FIGS. 1 and/or 2.

FIG. 11 is a block diagram of an example processor platform 1100 structured to execute and/or instantiate the machine readable instructions and/or the operations of FIGS. 4-8 to implement the receipt extractor circuitry 112 of FIGS. 1 and/or 2. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example image retrieval circuitry 205, the example pixel analyzer circuitry 210, the example pixel mask generator circuitry 215, the example mirror data generator circuitry 220, the example vertex cluster circuitry 225, the example image contour generator circuitry 230, the example coordinates distance calculator circuitry 235, the example text extractor circuitry 240, and the example report generator circuitry 245.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1132, which may be implemented by the machine readable instructions of FIGS. 4-8, may be stored in the mass storage device 1128, in the volatile memory 1114, in the non-volatile memory 1116, and/or on a removable non-transitory computer readable storage medium such as a CD or DVD.

Figure 12:
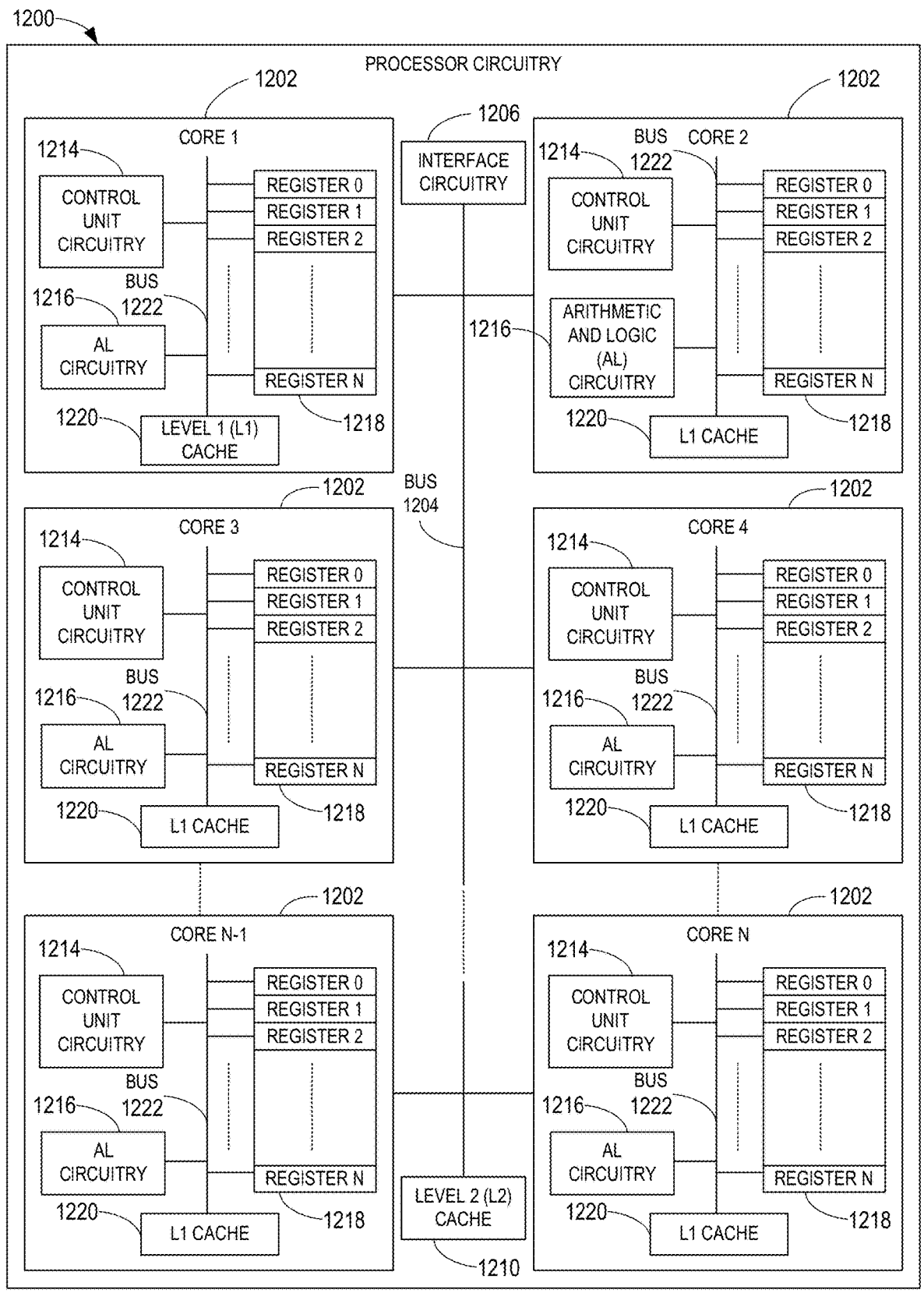
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a microprocessor 1200. For example, the microprocessor 1200 may be a general purpose microprocessor (e.g., general purpose microprocessor circuitry). The microprocessor 1200 executes some or all of the machine readable instructions of the flowcharts of FIGS. 4-8 to effectively instantiate the report extractor circuitry 112 of FIG. 2 as logic circuits to perform the operations corresponding to those machine readable instructions. In some such examples, the report extractor circuitry 112 of FIG. 2 is instantiated by the hardware circuits of the microprocessor 1200 in combination with the instructions. For example, the microprocessor 1200 may be implemented by multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowcharts of FIGS. 4-8.

The cores 1202 may communicate by a first example bus 1204. In some examples, the first bus 1204 may be implemented by a communication bus to effectuate communication associated with one(s) of the cores 1202. For example, the first bus 1204 may be implemented by at least one of an Inter-Integrated Circuit (I2C) bus, a Serial Peripheral Interface (SPI) bus, a PCI bus, or a PCIe bus. Additionally or alternatively, the first bus 1204 may be implemented by any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2 cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the local memory 1220, and a second example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The second bus 1222 may be implemented by at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
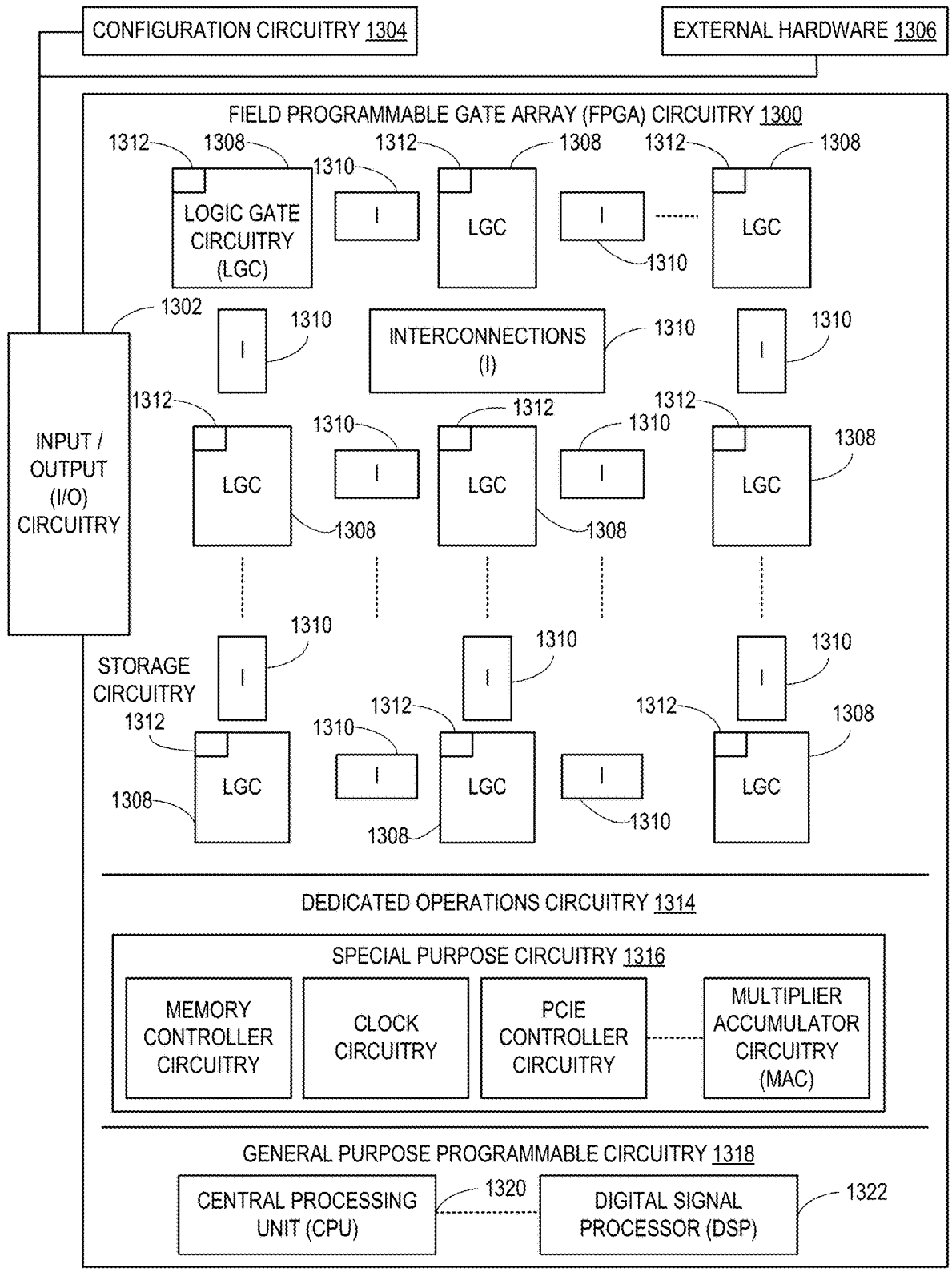
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. For example, the FPGA circuitry 1300 may be implemented by an FPGA. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowcharts of FIGS. 4-8 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIGS. 4-8. In particular, the FPGA circuitry 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIGS. 4-8. As such, the FPGA circuitry 1300 may be structured to effectively instantiate some or all of the machine readable instructions of the flowcharts of FIGS. 4-8 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 4-8 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware 1306. For example, the configuration circuitry 1304 may be implemented by interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may be implemented by external hardware circuitry. For example, the external hardware 1306 may be implemented by the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and the configurable interconnections 1310 are configurable to instantiate one or more operations that may correspond to at least some of the machine readable instructions of FIGS. 4-8 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The configurable interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an onboard CPU, such as one or more of the example CPU 1320 of FIG. 13. Therefore, the processor circuitry 112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIGS. 4-8 may be executed by one or more of the cores 1202 of FIG. 12, a second portion of the machine readable instructions represented by the flowcharts of FIGS. 4-8 may be executed by the FPGA circuitry 1300 of FIG. 13, and/or a third portion of the machine readable instructions represented by the flowcharts of FIGS. 4-8 may be executed by an ASIC. It should be understood that some or all of the receipt extractor circuitry 112 of FIG. 2 may, thus, be instantiated at the same or different times. Some or all of the circuitry may be instantiated, for example, in one or more threads executing concurrently and/or in series. Moreover, in some examples, some or all of the receipt extractor circuitry 112 of FIG. 2 may be implemented within one or more virtual machines and/or containers executing on the microprocessor.

In some examples, the processor circuitry 1112 of FIG. 11 may be in one or more packages. For example, the microprocessor 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
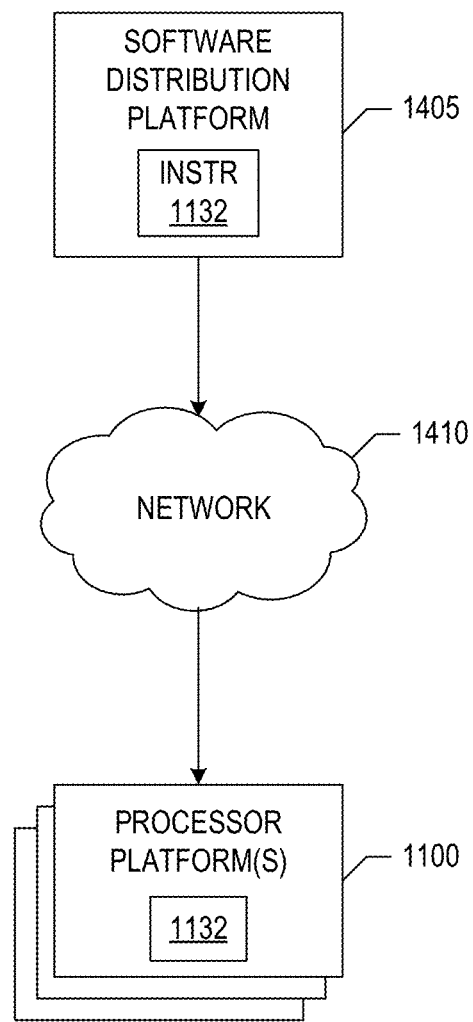
FIG. 14 is a block diagram of an example software distribution platform (e.g., one or more servers) to distribute software (e.g., software corresponding to the example machine readable instructions of FIGS. 4-8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions 400, 500, 600, 700, and/or 800 of FIGS. 4-8, as described above. The one or more servers of the example software distribution platform 1405 are in communication with an example network 1410, which may correspond to any one or more of the Internet and/or any of the example networks 106, 1410 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions 400, 500, 600, 700, and/or 800 of FIGS. 4-8, may be downloaded to the example processor platform 400, which is to execute the machine readable instructions 1132 to implement the receipt extractor circuitry 112 of FIGS. 1 and/or 2. In some examples, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices.

Example 1 includes a non-transitory computer readable medium comprising instructions that, when executed, cause processor circuitry to at least improve region of interest detection efficiency by converting pixels of an input receipt image from a first format to a second format, generate a binary representation of the input receipt image based on the converted pixels, the binary representation of the input receipt image corresponding to saturation values for respective ones of the converted pixels, calculate mirror data from the binary representation of the input receipt image, cluster the binary representation of the input receipt image to identify a first set of candidate regions of interest, the candidate regions of interest characterized by portions of the binary representation of the input receipt image having saturation values that satisfy a threshold value, compute center coordinates of corresponding ones of the first set of candidate regions of interest of the binary representation of the input receipt image, and cluster the mirror data to identify a second set of candidate regions of interest, the second set of candidate regions of interest used to measure an accuracy of the first set of candidate regions of interest.

Example 2 includes the non-transitory computer readable medium of example 1, wherein the instructions, when executed, cause the processor circuitry to further compute contour coordinates of respective ones of the second set of candidate regions of interest of the mirror data, calculate a distance metric between ones of the cluster coordinates and ones of the contour coordinates, the distance metric indicative of an accuracy of identification of one or more of the first or second set of candidate regions of interest, sort the calculated distance metrics to determine a final region of interest of high accuracy, extract text from the final region of interest, and report extraction results for use in improvement of retail process analysis.

Example 3 includes the non-transitory computer readable medium of example 2, wherein the instructions, when executed, cause the processor circuitry to report the extraction results via a graphical user interface.

Example 4 includes the non-transitory computer readable medium of example 2, wherein the instructions, when executed, cause the processor circuitry to sort the calculated distance metrics in ascending or descending order to determine a final region of interest.

Example 5 includes the non-transitory computer readable medium of example 2, wherein the instructions, when executed, cause the processor circuitry to determine the final region of interest that has a minimum associated distance metric.

Example 6 includes the non-transitory computer readable medium of example 1, wherein the instructions, when executed, cause the processor circuitry to retrieve the input receipt image from a receipt image capturing device.

Example 7 includes the non-transitory computer readable medium of example 1, wherein the instructions, when executed, cause the processor circuitry to retrieve the input receipt image from a data storage device.

Example 8 includes the non-transitory computer readable medium of example 1, wherein the instructions, when executed, cause the processor circuitry to convert the pixels of the input receipt image from an RGB (Red, Green, Blue) format to an HSV (Hue, Saturation, Value) format.

Example 9 includes the non-transitory computer readable medium of example 1, wherein the instructions, when executed, cause the processor circuitry to represent the binary representation of the input receipt image as a bit plane matrix.

Example 10 includes the non-transitory computer readable medium of example 9, wherein the instructions, when executed, cause the processor circuitry to generate the bit plane matrix using a K-means clustering algorithm.

Example 11 includes the non-transitory computer readable medium of example 1, wherein the binary representation of the input receipt image corresponds to hue values for respective ones of the converted pixels.

Example 12 includes an apparatus to extract text from a region of interest within a receipt comprising interface circuitry to access an image from a receipt image capturing device, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations according to instructions, and one or more registers to store a result of the one or more first operations, the instructions in the apparatus, a Field Programmable Gate Array (FPGA) including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations or the third operations to instantiate pixel analyzing circuitry to improve region of interest detection efficiency by converting pixels of an input receipt image from a first format to a second format, pixel mask generator circuitry to generate a binary representation of the input receipt image based on the converted pixels, the binary representation of the input receipt image corresponding to saturation values for respective ones of the converted pixels, mirror data generator circuitry to calculate mirror data from the binary representation of the input receipt image, vertex cluster circuitry to cluster the binary representation of the input receipt image to identify a first set of candidate regions of interest, the candidate regions of interest characterized by portions of the binary representation of the input receipt image having saturation values that satisfy a threshold value, and compute center coordinates of corresponding ones of the first set of candidate regions of interest of the binary representation of the input receipt image, and image contour generator circuitry to cluster the mirror data to identify a second set of candidate regions of interest, the second set of candidate regions of interest used to measure an accuracy of the first set of candidate regions of interest.

Example 13 includes the apparatus of example 12, wherein the processor circuitry is to further instantiate image contour generator circuitry to compute contour coordinates of respective ones of the second set of candidate regions of interest of the mirror data, coordinates distance calculator circuitry to calculate a distance metric between ones of the cluster coordinates and ones of the contour coordinates, the distance metric indicative of an accuracy of identification of one or more of the first or second set of candidate regions of interest, and sort the calculated distance metrics to determine a final region of interest of high accuracy, text extractor circuitry to extract text from the final region of interest, and report generator circuitry to report extraction results for use in improvement of retail process analysis.

Example 14 includes the apparatus of example 13, wherein the report generator circuitry is to report the extraction results via a graphical user interface.

Example 15 includes the apparatus of example 13, wherein the coordinates distance calculator circuitry is to sort the calculated distance metrics in ascending or descending order to determine a final region of interest.

Example 16 includes the apparatus of example 13, wherein the coordinates distance calculator circuitry is to determine the final region of interest that has a minimum associated distance metric.

Example 17 includes the apparatus of example 12, wherein image retrieval circuitry is to retrieve the input receipt image from a receipt image capturing device.

Example 18 includes the apparatus of example 12, wherein image retrieval circuitry is to retrieve the input receipt image from a data storage device.

Example 19 includes the apparatus of example 12, wherein the pixel analyzer circuitry is to convert the pixels of the input receipt image from an RGB (Red, Green, Blue) format to an HSV (Hue, Saturation, Value) format.

Example 20 includes the apparatus of example 12, wherein the pixel mask generator circuitry is to represent the binary representation of the input receipt image as a bit plane matrix.

Example 21 includes the apparatus of example 20, wherein the pixel mask generator circuitry is to generate the bit plane matrix using a K-means clustering algorithm.

Example 22 includes the apparatus of example 20, wherein the binary representation of the input receipt image corresponds to hue values for respective ones of the converted pixels.

Example 23 includes a method to extract text in a region of interest from a receipt, the method comprising improving region of interest detection efficiency by converting pixels of an input receipt image from a first format to a second format, generating a binary representation of the input receipt image based on the converted pixels, the binary representation of the input receipt image corresponding to saturation values for respective ones of the converted pixels, calculating mirror data from the binary representation of the input receipt image, clustering the binary representation of the input receipt image to identify a first set of candidate regions of interest, the candidate regions of interest characterized by portions of the binary representation of the input receipt image having saturation values that satisfy a threshold value, computing center coordinates of corresponding ones of the first set of candidate regions of interest of the binary representation of the input receipt image, and clustering the mirror data to identify a second set of candidate regions of interest, the second set of candidate regions of interest used to measure an accuracy of the first set of candidate regions of interest.

Example 24 includes the method of example 23, further comprising computing contour coordinates of respective ones of the second set of candidate regions of interest of the mirror data, calculating a distance metric between ones of the cluster coordinates and ones of the contour coordinates, the distance metric indicative of an accuracy of identification of one or more of the first or second set of candidate regions of interest, sorting the calculated distance metrics to determine a final region of interest of high accuracy, extracting text from the final region of interest, and reporting extraction results for use in improvement of retail process analysis.

Example 25 includes the method of example 24, further including reporting the extraction results via a graphical user interface.

Example 26 includes the method of example 24, further including sorting the calculated distance metrics in ascending or descending order to determine a final region of interest.

Example 27 includes the method of example 24, further including determining the final region of interest that has a minimum associated distance metric.

Example 28 includes the method of example 23, further including retrieving the input receipt image from a receipt image capturing device.

Example 29 includes the method of example 23, further including retrieving the input receipt image from a data storage device.

Example 30 includes the method of example 23, further including converting the pixels of the input receipt image from an RGB (Red, Green, Blue) format to an HSV (Hue, Saturation, Value) format.

Example 31 includes the method of example 23, further including representing the binary representation of the input receipt image as a bit plane matrix.

Example 32 includes the method of example 31, further including generating the bit plane matrix using a K-means clustering algorithm.

Example 33 includes the method of example 23, wherein the binary representation of the input receipt image corresponds to hue values for respective ones of the converted pixels.

From the foregoing, it will be appreciated that example methods, apparatus and articles of manufacture have been disclosed that extend the applications of extracting text from a receipt image for data analysis, etc. text extraction from physical receipts is preferred over manual text extraction for applications such as consumer trend tracking, inventory planning, etc. due to the high efficiency and/or speed at which it can be done.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A non-transitory computer readable medium comprising instructions that, when executed, cause processor circuitry to at least:
   improve region of interest detection efficiency by converting pixels of an input receipt image from a first format to a second format;
   generate a binary representation of the input receipt image based on the converted pixels, the binary representation of the input receipt image corresponding to saturation values for respective ones of the converted pixels;
   calculate mirror data from the binary representation of the input receipt image;
   cluster the binary representation of the input receipt image to identify a first set of candidate regions of interest, the candidate regions of interest characterized by portions of the binary representation of the input receipt image having saturation values that satisfy a threshold value;
   compute center coordinates of corresponding ones of the first set of candidate regions of interest of the binary representation of the input receipt image; and
   cluster the mirror data to identify a second set of candidate regions of interest, the second set of candidate regions of interest used to measure an accuracy of the first set of candidate regions of interest.

2. The non-transitory computer readable medium of claim 1, wherein the instructions, when executed, cause the processor circuitry to further:
   compute contour coordinates of respective ones of the second set of candidate regions of interest of the mirror data;
   calculate a distance metric between ones of the cluster coordinates and ones of the contour coordinates, the distance metric indicative of an accuracy of identification of one or more of the first or second set of candidate regions of interest;
   sort the calculated distance metrics to determine a final region of interest of high accuracy;
   extract text from the final region of interest; and
   report extraction results for use in improvement of retail process analysis.

3. The non-transitory computer readable medium of claim 2, wherein the instructions, when executed, cause the processor circuitry to report the extraction results via a graphical user interface.

4. The non-transitory computer readable medium of claim 2, wherein the instructions, when executed, cause the processor circuitry to sort the calculated distance metrics in ascending or descending order to determine a final region of interest.

5. The non-transitory computer readable medium of claim 2, wherein the instructions, when executed, cause the processor circuitry to determine the final region of interest that has a minimum associated distance metric.

6. The non-transitory computer readable medium of claim 1, wherein the instructions, when executed, cause the processor circuitry to retrieve the input receipt image from a receipt image capturing device.

7. The non-transitory computer readable medium of claim 1, wherein the instructions, when executed, cause the processor circuitry to retrieve the input receipt image from a data storage device.

8. The non-transitory computer readable medium of claim 1, wherein the instructions, when executed, cause the processor circuitry to convert the pixels of the input receipt image from an RGB (Red, Green, Blue) format to an HSV (Hue, Saturation, Value) format.

9. The non-transitory computer readable medium of claim 1, wherein the instructions, when executed, cause the processor circuitry to represent the binary representation of the input receipt image as a bit plane matrix.

10. The non-transitory computer readable medium of claim 9, wherein the instructions, when executed, cause the processor circuitry to generate the bit plane matrix using a K-means clustering algorithm.

11. The non-transitory computer readable medium of claim 1, wherein the binary representation of the input receipt image corresponds to hue values for respective ones of the converted pixels.

12. An apparatus to extract text from a region of interest within a receipt comprising:
   interface circuitry to access an image from a receipt image capturing device; and
   processor circuitry including one or more of:
      at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations according to instructions, and one or more registers to store a result of the one or more first operations, the instructions in the apparatus;
      a Field Programmable Gate Array (FPGA) including logic gate circuitry, a plurality of configurable interconnections, and storage circuitry, the logic gate circuitry and interconnections to perform one or more second operations, the storage circuitry to store a result of the one or more second operations; or
      Application Specific Integrate Circuitry (ASIC) including logic gate circuitry to perform one or more third operations;
   the processor circuitry to perform at least one of the first operations, the second operations or the third operations to instantiate:
      pixel analyzing circuitry to improve region of interest detection efficiency by converting pixels of an input receipt image from a first format to a second format;
      pixel mask generator circuitry to generate a binary representation of the input receipt image based on the converted pixels, the binary representation of the input receipt image corresponding to saturation values for respective ones of the converted pixels;
      mirror data generator circuitry to calculate mirror data from the binary representation of the input receipt image;
      vertex cluster circuitry to:
         cluster the binary representation of the input receipt image to identify a first set of candidate regions of interest, the candidate regions of interest characterized by portions of the binary representation of the input receipt image having saturation values that satisfy a threshold value; and
         compute center coordinates of corresponding ones of the first set of candidate regions of interest of the binary representation of the input receipt image; and
      image contour generator circuitry to cluster the mirror data to identify a second set of candidate regions of interest, the second set of candidate regions of interest used to measure an accuracy of the first set of candidate regions of interest.

13. The apparatus of claim 12, wherein the processor circuitry is to further instantiate:
   image contour generator circuitry to compute contour coordinates of respective ones of the second set of candidate regions of interest of the mirror data;
   coordinates distance calculator circuitry to:
      calculate a distance metric between ones of the cluster coordinates and ones of the contour coordinates, the distance metric indicative of an accuracy of identification of one or more of the first or second set of candidate regions of interest; and
      sort the calculated distance metrics to determine a final region of interest of high accuracy;
   text extractor circuitry to extract text from the final region of interest; and
   report generator circuitry to report extraction results for use in improvement of retail process analysis.

14. The apparatus of claim 13, wherein the report generator circuitry is to report the extraction results via a graphical user interface.

15. The apparatus of claim 13, wherein the coordinates distance calculator circuitry is to sort the calculated distance metrics in ascending or descending order to determine a final region of interest.

16. The apparatus of claim 13, wherein the coordinates distance calculator circuitry is to determine the final region of interest that has a minimum associated distance metric.

17. The apparatus of claim 12, wherein the pixel mask generator circuitry is to represent the binary representation of the input receipt image as a bit plane matrix.

18. The apparatus of claim 17, wherein the pixel mask generator circuitry is to generate the bit plane matrix using a K-means clustering algorithm.

19. A method to extract text in a region of interest from a receipt, the method comprising:
   improving region of interest detection efficiency by converting pixels of an input receipt image from a first format to a second format;
   generating a binary representation of the input receipt image based on the converted pixels, the binary representation of the input receipt image corresponding to saturation values for respective ones of the converted pixels;
   calculating mirror data from the binary representation of the input receipt image;
   clustering the binary representation of the input receipt image to identify a first set of candidate regions of interest, the candidate regions of interest characterized by portions of the binary representation of the input receipt image having saturation values that satisfy a threshold value;
   computing center coordinates of corresponding ones of the first set of candidate regions of interest of the binary representation of the input receipt image; and
   clustering the mirror data to identify a second set of candidate regions of interest, the second set of candidate regions of interest used to measure an accuracy of the first set of candidate regions of interest.

20. The method of claim 19, further comprising:
   computing contour coordinates of respective ones of the second set of candidate regions of interest of the mirror data;
   calculating a distance metric between ones of the cluster coordinates and ones of the contour coordinates, the distance metric indicative of an accuracy of identification of one or more of the first or second set of candidate regions of interest;

sorting the calculated distance metrics to determine a final region of interest of high accuracy;

extracting text from the final region of interest; and reporting extraction results for use in improvement of retail process analysis.

* * * * *